US012572898B2

(12) United States Patent
Janey et al.

(10) Patent No.: US 12,572,898 B2
(45) Date of Patent: Mar. 10, 2026

(54) SITE MAINTENANCE UTILIZING AUTONOMOUS VEHICLES

(71) Applicant: THE TORO COMPANY, Bloomington, MN (US)

(72) Inventors: Gregory S. Janey, Excelsior, MN (US); Alexander Steven Frick, Farmington, MN (US)

(73) Assignee: The Toro Company, Bloomington, MN (US)

( * ) Notice: Subject to any disclaimer, the term of this patent is extended or adjusted under 35 U.S.C. 154(b) by 105 days.

(21) Appl. No.: 17/766,186

(22) PCT Filed: Oct. 2, 2020

(86) PCT No.: PCT/US2020/054013
§ 371 (c)(1),
(2) Date: Apr. 1, 2022

(87) PCT Pub. No.: WO2021/067757
PCT Pub. Date: Apr. 8, 2021

(65) Prior Publication Data
US 2023/0259893 A1      Aug. 17, 2023

Related U.S. Application Data

(60) Provisional application No. 63/035,973, filed on Jun. 8, 2020, provisional application No. 62/910,214, filed on Oct. 3, 2019.

(51) Int. Cl.
*G06Q 10/20*          (2023.01)
(52) U.S. Cl.
CPC .................................. *G06Q 10/20* (2013.01)

(58) Field of Classification Search
CPC ..................................................... G06Q 10/20
See application file for complete search history.

(56) References Cited

U.S. PATENT DOCUMENTS

| 10,188,029 B1 | 1/2019 | Brown et al. | |
| 11,400,823 B1 * | 8/2022 | Sampath | ................. B60L 58/12 |
| 2005/0034437 A1 * | 2/2005 | McMurtry | ........... G05D 1/0219 56/1 |

(Continued)

FOREIGN PATENT DOCUMENTS

EP          1488296 B1 *   4/2006   ............. B60K 31/04

OTHER PUBLICATIONS

Kushwaha, Dilip & Sahoo, P.K. & Pradhan, Nrusingh & Makwana, Yash & Mani, Indra, "Robotics Application in Agriculture". 55 Annual Convention of Indian Society of Agricultural Engineers and International Symposium (Jun. 2022) (Year: 2022).*

(Continued)

*Primary Examiner* — Andrew Chase Lakhani
(74) *Attorney, Agent, or Firm* — Merchant & Gould P.C.

(57)          ABSTRACT

A maintenance system operates to coordinate site maintenance activities among a human maintenance crew and a fleet of autonomous vehicles. A maintenance plan is developed for a region of the site, which includes a sequence of at least some of the tasks. Maintenance tasks are then assigned to the maintenance crew and autonomous vehicles. The system monitors the performance of the tasks, and upon completion of the tasks, assigns other incomplete tasks until all tasks have been completed.

18 Claims, 15 Drawing Sheets

(56)            References Cited

U.S. PATENT DOCUMENTS

| | | | |
|---|---|---|---|
| 2010/0063626 A1* | 3/2010 | Anderson | G05D 1/0221 |
| | | | 901/50 |
| 2010/0094481 A1* | 4/2010 | Anderson | A01D 34/008 |
| | | | 701/1 |
| 2011/0166715 A1* | 7/2011 | Hoffman | A01G 25/16 |
| | | | 700/284 |
| 2013/0041526 A1 | 2/2013 | Ouyang | |
| 2013/0123981 A1* | 5/2013 | Lee | H04W 4/02 |
| | | | 901/1 |
| 2014/0032033 A1* | 1/2014 | Einecke | G06V 20/10 |
| | | | 701/27 |
| 2016/0165795 A1* | 6/2016 | Balutis | G05D 1/0088 |
| | | | 701/25 |
| 2017/0192423 A1 | 7/2017 | Rust et al. | |
| 2017/0349058 A1 | 12/2017 | Bernier et al. | |
| 2018/0035606 A1* | 2/2018 | Burdoucci | A01G 3/085 |
| 2018/0143634 A1* | 5/2018 | Ott | G05D 1/0297 |
| 2018/0213731 A1* | 8/2018 | Wykman | H04W 4/021 |
| 2019/0230850 A1* | 8/2019 | Johnson | A01D 75/006 |
| 2019/0370917 A1* | 12/2019 | Vanslette | G06Q 10/067 |
| 2020/0133305 A1* | 4/2020 | Gariepy | G05D 1/0297 |
| 2020/0342420 A1* | 10/2020 | Zatta | G06Q 10/06315 |
| 2020/0368912 A1* | 11/2020 | Murty | G06V 20/13 |
| 2021/0114614 A1* | 4/2021 | Weslosky | G06F 11/0793 |
| 2021/0337726 A1* | 11/2021 | Keski-Luopa | A01D 34/008 |
| 2021/0382476 A1* | 12/2021 | Morrison | G06Q 10/047 |
| 2022/0129000 A1* | 4/2022 | Ingvalson | G05D 1/227 |

OTHER PUBLICATIONS

Prasad et al., "Autonomous Lawn Mower", Indo-American Journal of Mechanical Engineering. vol. 14, Issue 2, pp. 68-72 (Apr. 2025) (Year: 2025).*

International Search Report and Written Opinion for PCT/US2020/054013 (Jan. 22, 2021).

Extended Search Report in Application 20871759.5, dated Dec. 14, 2023, 11 pages.

* cited by examiner

102

700

Classify Site 702

Determine tasks 704

Determine task complexity and task rules 706

Generate task list for site 708

800

Determine site perimeter  802

Define site exclusion regions 804

Segment remaining site regions into a plurality of grids 806

For each grid, determine a region type and features located therein 808

For each grid, determine one or more scores for the grid 810

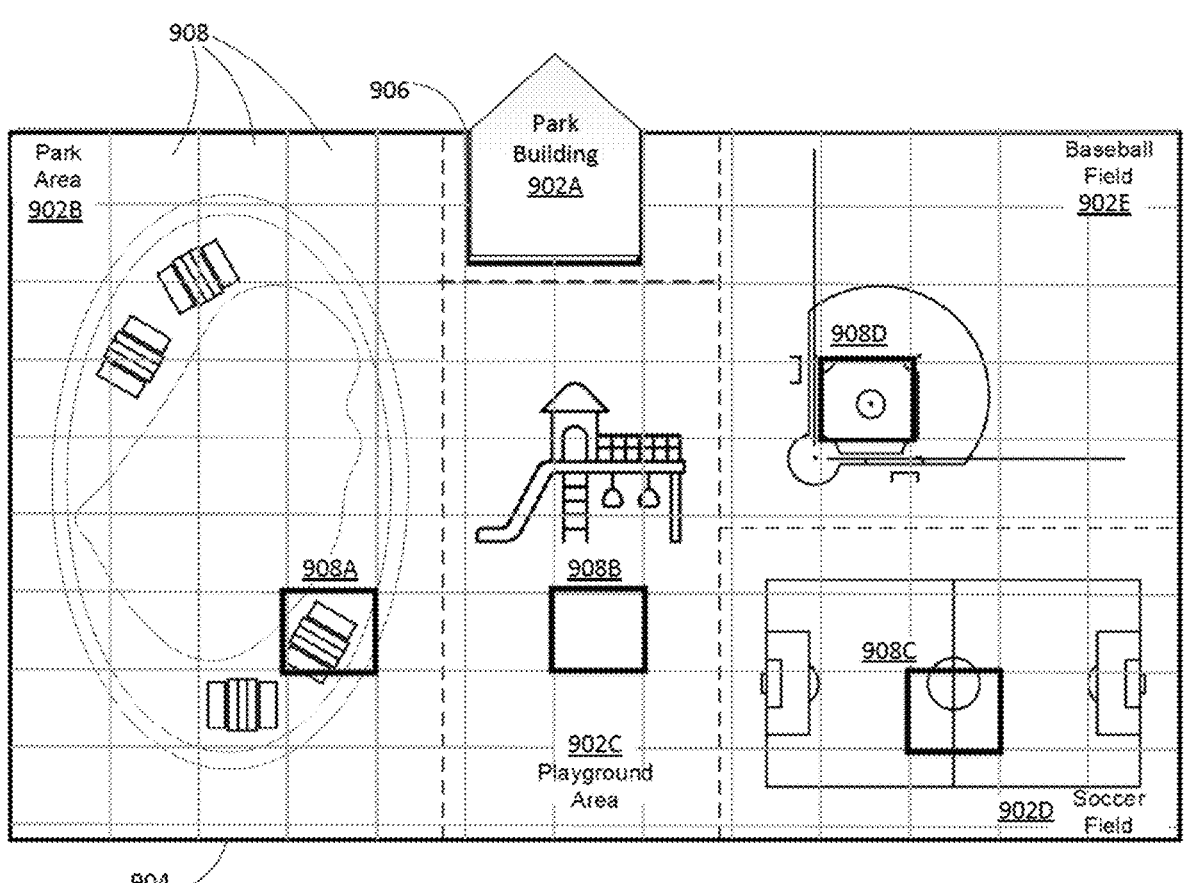
*FIG. 9*

Figure 10:
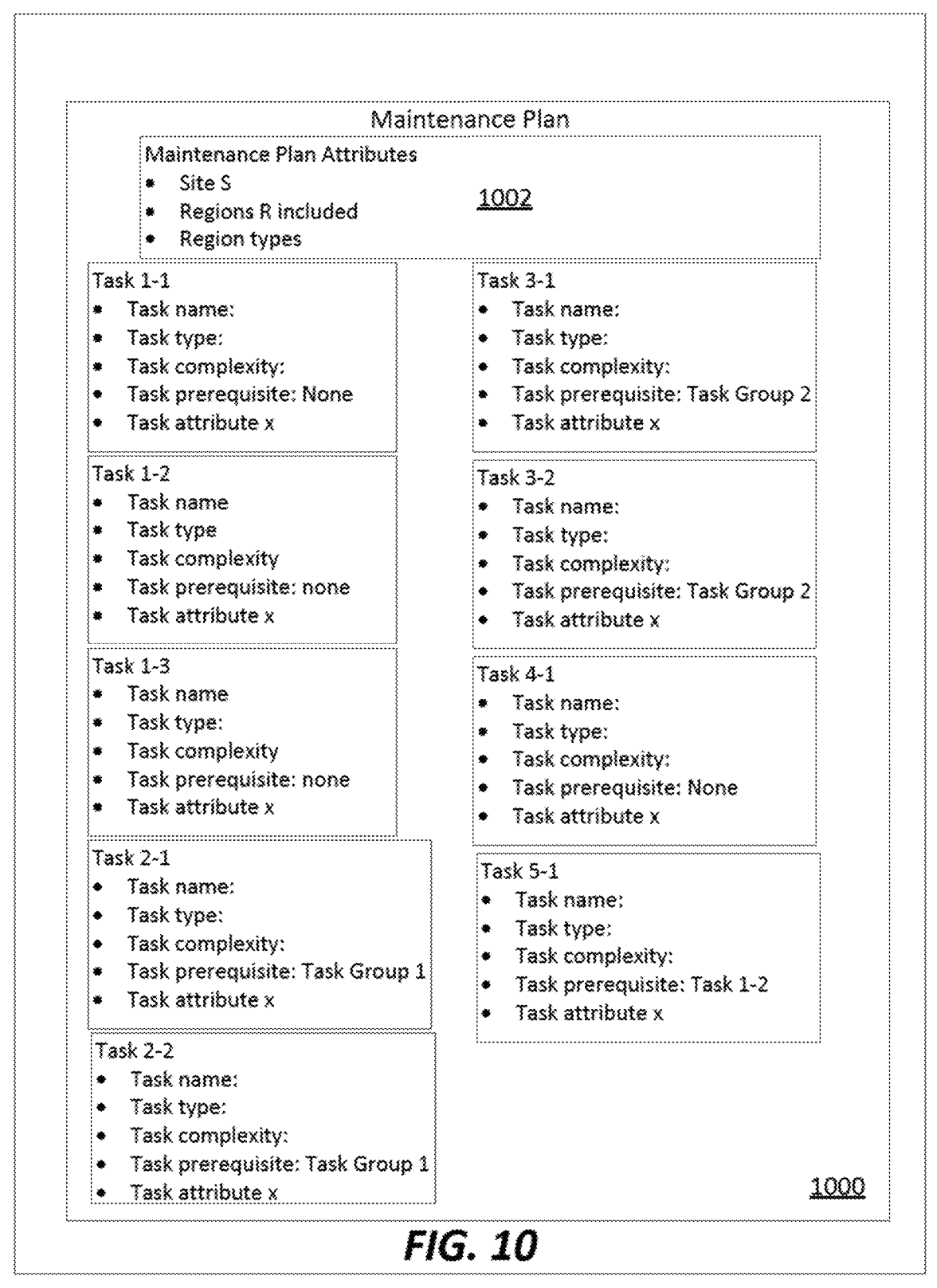

Maintenance Plan

Maintenance Plan Attributes
* Site S
* Regions R included     <u>1002</u>
* Region types Task 1-1
* Task name:
* Task type:
* Task complexity:
* Task prerequisite: None
* Task attribute x Task 1-2
* Task name
* Task type
* Task complexity
* Task prerequisite: none
* Task attribute x Task 1-3
* Task name
* Task type:
* Task complexity
* Task prerequisite: none
* Task attribute x Task 2-1
* Task name:
* Task type:
* Task complexity:
* Task prerequisite: Task Group 1
* Task attribute x Task 2-2
* Task name:
* Task type:
* Task complexity:
* Task prerequisite: Task Group 1
* Task attribute x Task 3-1
* Task name:
* Task type:
* Task complexity:
* Task prerequisite: Task Group 2
* Task attribute x Task 3-2
* Task name:
* Task type:
* Task complexity:
* Task prerequisite: Task Group 2
* Task attribute x Task 4-1
* Task name:
* Task type:
* Task complexity:
* Task prerequisite: None
* Task attribute x Task 5-1
* Task name:
* Task type:
* Task complexity:
* Task prerequisite: Task 1-2
* Task attribute x <u>1000</u>

Determining task assignment 1202

Transmit task assignments to task owners 1204

Monitor task completion progress 1206

Determine task exceptions 1208

Reassign/adjust task 1210

1300

1302 {   Site Complexity    1304 Task Complexity    1306 Resource Availability    1308

102

Maintenance Manager 120

1310

Task Assignments

SITE MAINTENANCE UTILIZING AUTONOMOUS VEHICLES

This application is a National Stage Application of PCT/US2020/054013, filed Oct. 2, 2020, which claims benefit of and priority to U.S. Application No. 63/035,973 filed on Jun. 8, 2020, and to U.S. Application No. 62/910,214 filed on Oct. 3, 2019, which are titled SITE MAINTENANCE UTILIZING AUTONOMOUS VEHICLES, which applications are incorporated herein by reference in their entireties. To the extent appropriate, a claim of priority is made to each of the above-disclosed applications.

BACKGROUND

Maintaining outdoor sites, such as turf sites like golf courses, business grounds, amusement parks, large home-owner's association grounds, etc., can be complex. The maintenance site can include large areas and require a plurality of varied maintenance tasks. Further, the mainte-nance tasks may need to be done at particular times and in a particular sequence or order.

Due to the complexity of maintenance of outdoor sites, maintenance can be a costly affair requiring numerous machines and tools requiring human operators. Require-ments for maintenance tasks to be done in a particular sequence or order can exacerbate costs due to idle time of operators waiting for a prerequisite task to be completed so that they can perform their assigned task. Autonomous vehicles have been used to automate certain outdoor site maintenance tasks, however, such autonomous vehicles can-not do certain complex tasks, and often still require over-sight for tasks they can complete. Therefore, there is a need for a management system that optimizes both outdoor site maintenance tasks to be completed by autonomous vehicles, a human maintenance crew, and combinations thereof.

SUMMARY

In general terms, this disclosure is directed to an outdoor site maintenance system. In one possible configuration and by non-limiting example, the management system identifies one or more regions of an outdoor site requiring mainte-nance and determines a set of maintenance tasks that need to be completed based on region type. In some embodiments, the management system allocates one or more of the tasks to a fleet of autonomous vehicles and a human maintenance crew. Various aspects are described in this disclosure, which include, but are not limited to, the following aspects.

One aspect is a method of maintaining a site using an autonomous vehicle and a human operator, the method comprising: identifying a region of a site to be maintained, the region being associated with a region type; determining a maintenance plan for the region, the maintenance plan including maintenance tasks to be completed based at least in part on the region type of the region; assigning a first task from the maintenance tasks to at least one of: the autono-mous vehicle and the human operator; based on the assign-ment, transmitting instructions to perform the first task to the at least one of: the autonomous vehicle and a crew comput-ing device associated with the human operator; monitoring performance of the first task; upon completion of the first task, identifying incomplete tasks from the maintenance tasks of the maintenance plan for the region; assigning a second task from the incomplete tasks to at least one of: the autonomous vehicle and the human operator; and based on the assignment of the second task, transmitting instructions to perform the second task to the at least one of the autonomous vehicle and the crew computing device asso-ciated with the human operator.

Another aspect is a maintenance system for maintaining an outdoor site, the system comprising: an autonomous vehicle; a crew computing device associated with a human operator; and a maintenance management computing system including a maintenance management tool including a com-puter readable storage device storing data instructions that, when executed by the maintenance management computing system, cause the maintenance management computing sys-tem to: identify a region of a site to be maintained, the region being associated with a region type; determine a mainte-nance plan for the region, the maintenance plan including maintenance tasks to be completed based at least in part on the region type of the region; assign a first task from the maintenance tasks to at least one of: the autonomous vehicle and the human operator; based on the assignment, transmit instructions to perform the first task to the at least one of: the autonomous vehicle and the crew computing device asso-ciated with the human operator; monitor performance of the first task by receiving updates from the at least one of: the autonomous vehicle and the crew computing device; upon completion of the first task, identify incomplete tasks from the maintenance tasks of the maintenance plan for the region; assign a second task from the incomplete tasks to at least one of: the autonomous vehicle and the human opera-tor; and based on the assignment of the second task, trans-mitting instructions to perform the second task to the at least one of: the autonomous vehicle and the crew computing device.

A method of developing a maintenance plan for a site, the method comprising: defining boundaries of the site; seg-menting the site into a plurality of regions; associating each of the regions with a region type; determining tasks to be completed for each region type; determining task complex-ity and task rules for the tasks; and generating the mainte-nance plan including a list of the tasks for the site, task complexity, and task rules.

BRIEF DESCRIPTION OF THE DRAWINGS

FIG. 9 is a map depicting an example site that is classified using the site classification method described in FIG. 8.

FIG. 10 is an example maintenance plan in which aspects of the present disclosure can be implemented.

DETAILED DESCRIPTION

Figure 1:
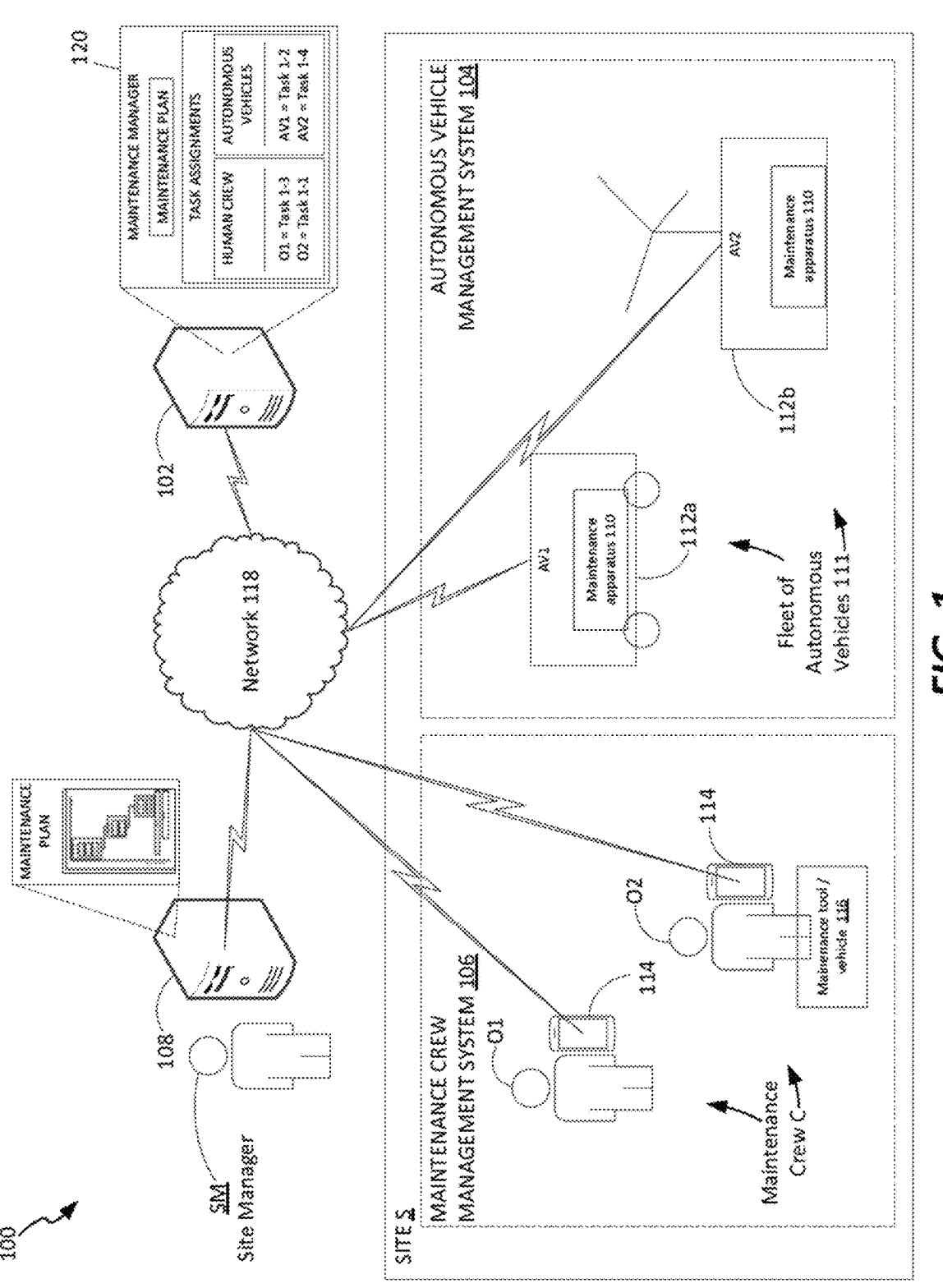
FIG. 1 is a schematic view of an example outdoor site environment in which aspects of the present disclosure can be implemented.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Maintaining outdoor sites can be complex. The maintenance site can include large areas and require a plurality of varied maintenance tasks, for example mowing, raking, application of products such as liquid or granular insecticides, herbicides, or fertilizer, trimming such as hedge, tree, bush, or other plant trimming, debris cleaning, etc. Further, the maintenance tasks may need to be done at particular times and in a particular sequence or order.

Due to the complexity of maintenance of outdoor sites, maintenance can be a costly affair requiring numerous machines and tools requiring human operators. Requirements for maintenance tasks to be done in a particular sequence or order can exacerbate costs due to idle time of operators waiting for a prerequisite task to be completed so that they can perform their assigned task. Autonomous vehicles have been used to automate certain outdoor site maintenance tasks, however, such autonomous vehicles cannot do certain complex tasks, and still require oversight for tasks they can complete. There can be certain tasks or circumstances that an autonomous vehicle does not have the capability to handle on its own, and require human intervention. For example, removing an object such as a rake in the way of an autonomous mower. Therefore, there is a need for a management system that optimizes both outdoor site maintenance tasks to be completed by autonomous vehicles, a human maintenance crew, and combinations thereof.

FIG. 1 is a schematic block diagram illustrating an example maintenance system 100 for maintaining a site S. FIG. 1 also illustrates a site manager SM and a human maintenance crew C that includes one or more human operators, such as human operators O1 and O2. The example maintenance system 100 includes a maintenance management computing system 102, an autonomous vehicle management system 104 (including a fleet of autonomous vehicles 111, including autonomous vehicles 112 (112a and 112b)), and a maintenance crew management system 106 (including one or more crew computing devices 114 and one or more maintenance tools 116). Some embodiments also include a site manager computing device 108. The maintenance system 100 utilizes a network 118 for data communication.

In the illustrated example, the maintenance system 100 operates to receive input from the site manager SM to develop a maintenance plan that defines tasks to be performed by the human maintenance crew C and the fleet of autonomous vehicles 111. The system 100 then operates to assign tasks to the maintenance crew C and to the autonomous vehicles 112 and to monitor for completion of the tasks until all tasks have been completed.

The site S is an outdoor environment, namely a portion of the Earth, for which certain maintenance tasks need to be performed by the maintenance system 100. One example of a site S is a turf site that includes turf grass to be maintained, such as by watering, mowing, raking, applying chemicals, and the like. One more specific example of a site is a golf course, which includes both turf and non-turf regions. A golf course requires maintenance tasks such as mowing fairways, greens, and tee boxes to different lengths, pruning and trimming trees and shrubs, repairing paths and walkways, raking sand traps, and fertilizing the greens and fairways. As another example, the site S can be the outdoor grounds of a business park with one or multiple buildings and parking lots, requiring maintenance tasks such as mowing and fertilizing of lawn, trimming and pruning of trees and shrubs, and sweeping and clearing debris from parking lots. The site S is typically an outdoor site. Examples of the site S are illustrated and described in further detail herein with reference to FIGS. 2 and 3.

The site manager SM is the person in charge of maintaining the site S. The site manager can interact with the maintenance system 100 through one or more site manager computing devices 108, which can include a desktop computer located in the management office, or a mobile device such as a smartphone or tablet computer that the site manager can use while moving about the site S, or remotely.

The maintenance crew C includes one or more human maintenance operators O1 and O2 who perform maintenance tasks at the site, such as using one or more maintenance tools 116. The maintenance tools can include maintenance vehicles. The maintenance crew C and the operators O1 and O2 are described in further detail with reference to the maintenance crew management system 106.

The maintenance management computing system 102 operates to manage the maintenance of the site S. In some embodiments, maintenance management computing system 102 can determine the maintenance tasks required to complete site maintenance or a specified site maintenance job, determine a sequence in which the required maintenance tasks are to be performed, and can assign maintenance tasks to one or more autonomous vehicles 112 and one or more operators O1 and O2 in the human maintenance crew C. The maintenance management computing system 102 can include a maintenance manager tool 120 that can determine the maintenance tasks required to complete site maintenance or a specified site maintenance job, determine a sequence in which the required maintenance tasks are to be performed, and can assign maintenance tasks to one or more autonomous vehicles 112 and one or more operators O1 and O2 in the human maintenance crew C.

In some embodiments the maintenance management computing system 102 includes a maintenance manager that can represent a maintenance server, as well as one or more additional servers. In some embodiments, the maintenance management computing system 102 can be distributed among a plurality of computing systems. In some embodiments, the maintenance management computing system 102 identifies maintenance jobs, which can be received from or defined in cooperation with the site manager SM through the site manager computing device 108, for example. In some embodiments, the maintenance management computing system 102 can determine the maintenance tasks required to complete site maintenance or a specified site maintenance job, determine the sequence in which the required maintenance tasks are required to be performed, and can assign the required maintenance tasks to one or more autonomous vehicles 112 and one or more operators O1 and O2 in the human maintenance crew C.

The autonomous vehicle management system 104, including one or more autonomous vehicles 112, operates to manage the tasks assigned to the autonomous vehicles 112. In the example shown, the autonomous vehicle 112*a* represents an autonomous lawn mower, and the autonomous vehicle 112*b* represent an autonomous aerial vehicle, such as a drone. In some embodiments, the autonomous vehicles 112 can include an autonomous aquatic vehicle. In general, the autonomous vehicles 112 can be any type of machine that is mobile and can perform site maintenance tasks, for example, a utility vehicle.

In the example shown, the autonomous vehicles 112 can receive maintenance task assignments from the maintenance management computing system 102. In some embodiments the maintenance management computing system 102 can monitor performance of tasks by the autonomous vehicles 112. For example, the maintenance management computing system 102 can receive the GPS coordinates of an autonomous vehicle 112, and determine if those coordinates correspond to a specific region and a specific time at which a task assigned to that autonomous vehicle 112 is to take place. In some embodiments, the autonomous vehicles 112 can communicate with each other as well as other humans (such as other operators O1 and O2, and the site manager SM) or other computing devices of the maintenance system 100. In the example shown, the autonomous vehicles 112 also include a maintenance apparatus 110, for example, a lawn mowing apparatus, or a chemical spreading or spraying apparatus, or a cargo bed or trailer. In other embodiments, the autonomous vehicles 112 do not include a maintenance apparatus 110 and can carry a payload or an audio visual capture or transmission system. Some of the autonomous vehicles 112 can be specialized to perform certain types of tasks. Additionally, some of the autonomous vehicles 112 are better suited for performing tasks in certain environments.

The autonomous vehicles 112 can be stored on-site or offsite. If stored offsite within a trailer, for example, and brought to site S when needed, tasks will include tasks related to the transport to and from the site S and any further placement of the autonomous vehicles 112 near the regions to which they are assigned. In some examples, different people are performing the transporting and placement, some of which are associated with an external entity and others that are part of the maintenance crew C. For example, transporters can deliver the autonomous vehicles 112 to a plurality of different sites, such as site S, where the maintenance crew C of the site can then receive and place the autonomous vehicles 112. If the autonomous vehicles 112 are stored at a central location on-site, such as in a maintenance shed, similar tasks can be required to transport one or more of the autonomous vehicles 112 to the regions to which they are assigned, if far from the storage location, for example. Alternatively, the autonomous vehicles 112 can travel independently to their assigned regions from the central storage location. In other examples, each of the autonomous vehicles 112 can be stored individually or in small groups near the region to which they are assigned. For example, one or more of the autonomous vehicles 112 can dock at a station near the region. The autonomous vehicles 112 can be charged while stored.

The maintenance crew management system 106 operates to manage the tasks assigned to the human maintenance crew C, for example, the operators O1 and O2. In this example, the maintenance crew management system 106 includes one or more crew computing devices 114 and one or more maintenance tools 116. The crew computing devices 114 operate to receive maintenance task assignments from the maintenance management computing system 102 and to instruct the human operators O1 and O2 on what tasks are to be performed. In some embodiments the maintenance management computing system 102 can monitor performance of tasks through the crew computing devices 114. For example, the maintenance management computing system 102 can receive GPS coordinates of the crew computing device 114, and determine if those coordinates correspond to a specific region and a specific time at which a task assigned to an operator O1 is to take place. In some embodiments, the crew computing devices 114 can also be used by the human operators O1 and O2 to communicate with other humans (such as other operators Ox and the site manager SM) or other computing devices of the maintenance system 100. In the example shown, the maintenance crew management system 106 can also include maintenance tools 116 which the human maintenance crew C may need to complete assigned tasks. For example, the maintenance tools 116 can include hand tools such as rakes, clippers, hedge trimmers, shovels, hammers, etc. In some embodiments, the maintenance tools 116 can also include machines and vehicles, for example, a riding or push lawnmower, a mobile turf sprayer, a leaf blower, a tree trimmer, a chain saw, an aerator, a truck, a tractor, a cart, etc. The maintenance tools 116 do not require a computing device, but at least some maintenance tools can include a computing device. For example, a tractor, cart, riding lawnmower, can include a computing device. Or, alternatively, the computing device of the maintenance tool 116 can be a crew computing device that is used to communicate with the human maintenance operator who is operating the maintenance tool, and in some embodiments also to communicate with the maintenance tool 116 itself. In some embodiments, the assigned tasks do not require a maintenance tool 116.

The site manager computing device 108 operates to allow the site manager SM to interact with the maintenance system 100. For example, the site manager computing device 108 can be a mobile phone or a laptop computer with which the site manager SM uses to connect to the maintenance management computing system 102 and change the settings of the maintenance system 100 or to assign a maintenance job to the maintenance system 100. In some embodiments, the maintenance management computing system 102 can be implemented as the site manager computing device 108.

The network 118 can, in some embodiments, represent an at least partially public network such as the Internet.

Figure 2:
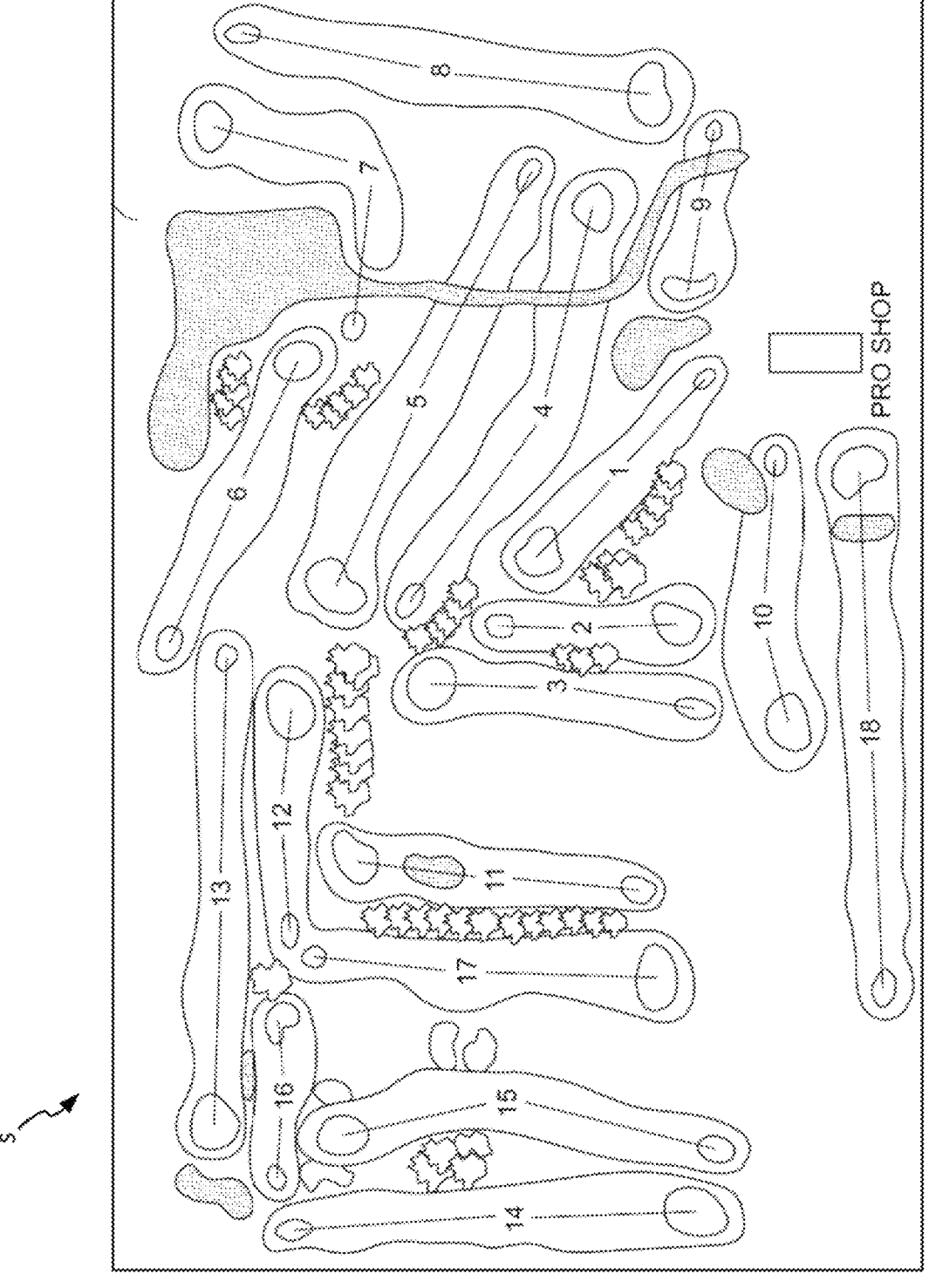
FIG. 2 is a map depicting an example site at which a management system can be used.
Figure 3:
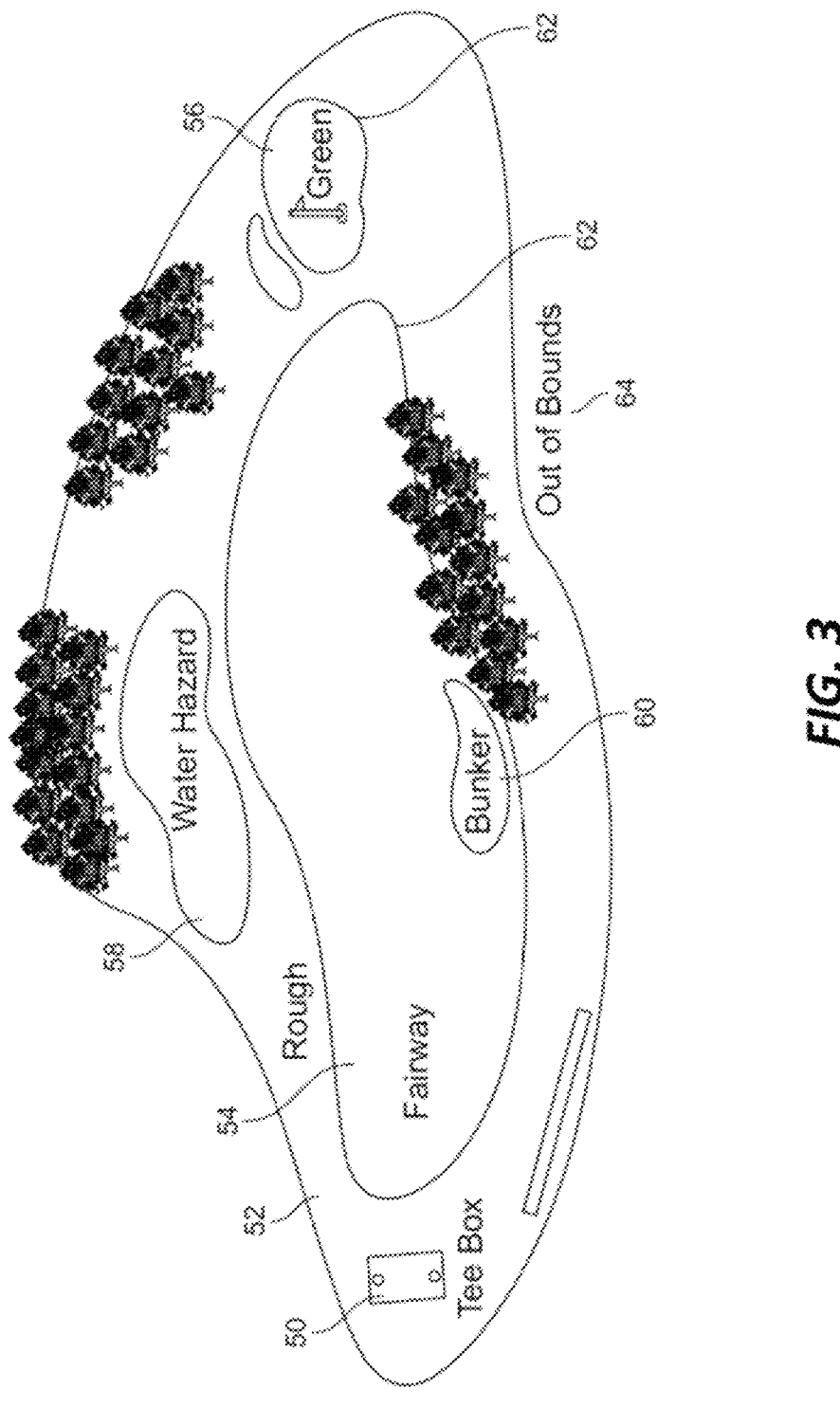
FIG. 3 is a schematic diagram depicting an example hole of a golf course.

FIGS. 2-3 illustrate examples of a maintenance site S in the form of a golf course. FIG. 2 is a map depicting an example site S on which the maintenance system 100 can be used. In this example, the site is an 18-hole golf course. FIG. 3 is a schematic diagram illustrating an example hole of a golf course.

In the example shown, the maintenance site S includes a plurality of regions. For example, the maintenance site S includes holes 1-18, sand traps and other hazards, water hazards including ponds and streams, roughs, areas between and around holes, pathways, a parking lot, and a pro shop building. In some embodiments, the regions are a part of the maintenance site for which maintenance is to be performed. However, in some embodiments, regions can be designated as inclusion regions or exclusion regions. An inclusion region is one that is designated to be maintained, while an exclusion region is one that is designated not to be maintained. As one example, a golf course rough may be designated as an inclusion region to be maintained, whereas a pond within the rough may be segregated out as an exclusion region that does not need to be maintained by the maintenance system 100.

In some embodiments, each of the regions is defined by boundaries and an area within the boundaries, and is designated as and associated with a particular region type. In some embodiments regions can be defined in a hierarchical structure of regions, sub-regions, and the like. For example, hole 1 can be designated as a "hole" and can include other regions, or sub-regions, for example a tee box, a fairway, and a green. The fairway of hole 1 is designated as a "fairway" region type and can include a specific area (not shown) within the boundaries of hole 1 illustrated. The areas and boundaries of the regions can be determined and defined by GPS coordinates, or by any other method for determining a particular location within the maintenance site S.

Referring to FIG. 3, each hole typically includes at least a tee box 50, a rough 52, a fairway 54, and a green 56. In addition, some holes include one or more hazards, such as a water hazard 58 or a sand bunker 60, and collars 62 around greens or fairways. Areas between or surrounding the holes are sometimes classified as out of bounds 64.

A great deal of effort and care goes into maintaining a high quality golf course. In particular, caring for the turf typically involves various maintenance activities including watering, mowing, aeration, top dressing, and the application of various products that can include (in addition to water) fertilizers, pesticides, fungicides, herbicides, growth regulators, colorants, and more. In some embodiments, products are chemical products.

One of the factors that complicates the maintenance of a golf course is that the golf course has many different regions, and depending on the characteristics of the region, many different maintenance steps are required. For example, the greens may require a certain amount of product (per unit area), whereas the fairways, roughs, and tee boxes may each require different amounts of the product. This is compounded by the fact that there are numerous holes, and also by the fact that numerous products may need to be applied. Further, at least some maintenance activities may be performed during the day when golfers are out on the course, for which the assigning of maintenance tasks must take into account, and may occasionally need to be modified as conditions change. For example, if a group of golfers arrives to play a hole at which a maintenance activity is being performed, the autonomous vehicle 112 or maintenance crew C can move on to another area to continue working, and return to complete the work at the interrupted hole once the golfers leave. One of the advantages of the maintenance system 100 is the ability to handle such modifications without the maintenance crew C or autonomous vehicles 112 waiting without working for the duration of an interruption, for example, while golfers play a hole.

Although a golf course is shown as one example of the maintenance site S, the present disclosure is equally applicable to a variety of other maintenance sites, such as commercial or residential properties, athletic fields, municipal parks, schools and university campuses, and other maintenance sites.

Figure 4:
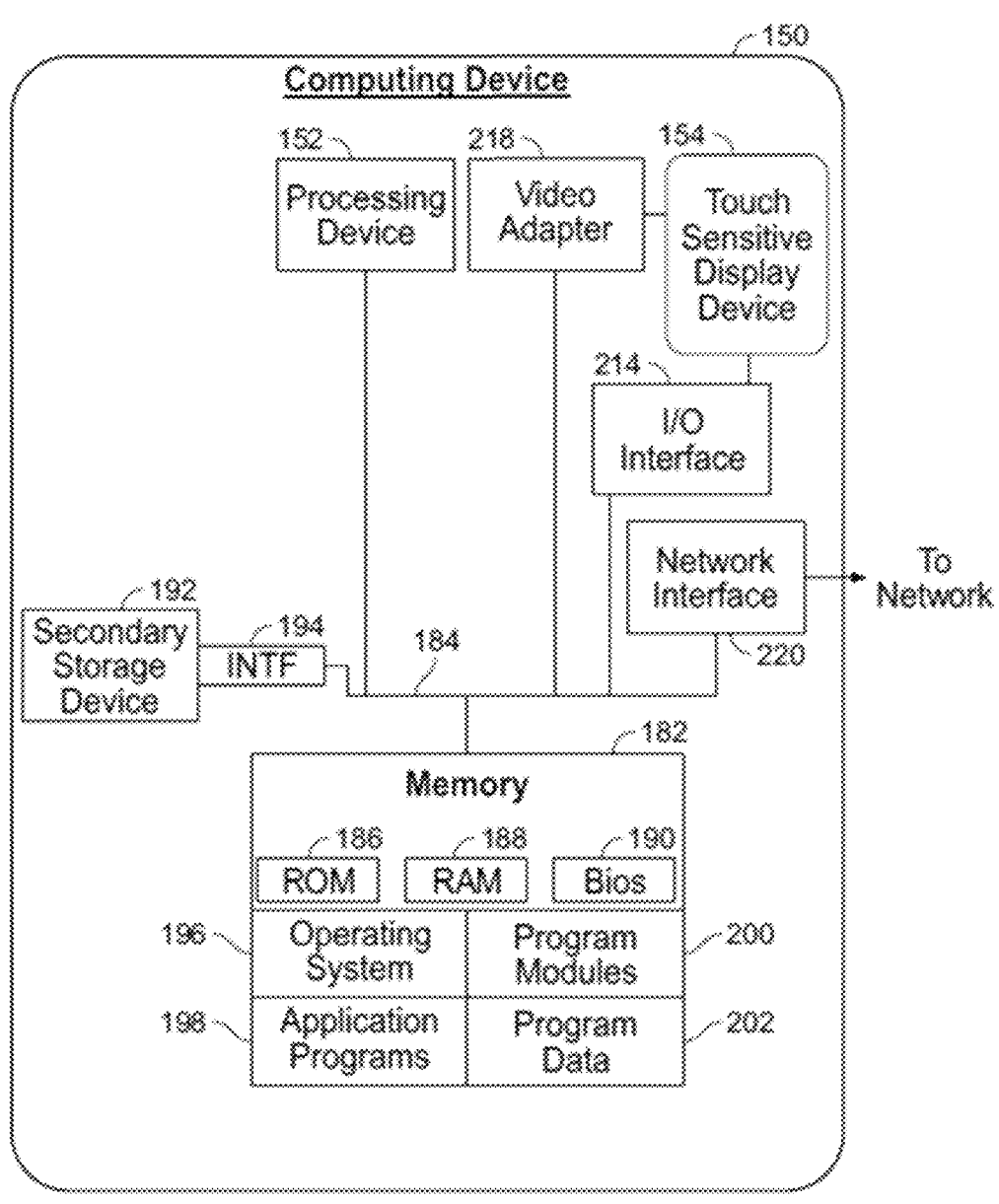
FIG. 4 is a schematic illustration of an example comput-ing device in which aspects of the present disclosure can be implemented.

FIG. 4 illustrates an exemplary architecture of a computing device 150 that can be used to implement aspects of the present disclosure, including any of the computing devices 102, 108, and 114, or other computing devices. The computing device 150 can also be a portion of the autonomous vehicles 112. The computing device illustrated in FIG. 4 can be used to execute the operating system, application programs, and software modules (including the software engines) described herein.

The computing device 150 includes, in some embodiments, at least one processing device 152, such as a central processing unit (CPU). A variety of processing devices are available from a variety of manufacturers, for example, Intel Corporation or Advanced Micro Devices, Inc. In this example, the computing device 150 also includes a system memory 182, and a system bus 184 that couples various system components including the system memory 182 to the processing device 180. The system bus 184 is one of any number of types of bus structures including a memory bus, or memory controller; a peripheral bus; and a local bus using any of a variety of bus architectures.

Examples of computing devices suitable for the computing device 150 include a server computer, a desktop computer, a laptop computer, a tablet computer, a mobile computing device (such as a smart phone, an iPod® or iPad® mobile digital device, or other mobile devices), or other devices configured to process digital instructions.

The system memory 182 includes read only memory 186 and random access memory 188. A basic input/output system 190 containing the basic routines that act to transfer information within computing device 150, such as during start up, is typically stored in the read only memory 186.

The computing device 150 also includes a secondary storage device 192 in some embodiments, such as a hard disk drive, for storing digital data. The secondary storage device 192 is connected to the system bus 184 by a secondary storage interface 194. The secondary storage devices 192 and their associated computer readable media provide nonvolatile storage of computer readable instructions (including application programs and program modules), data structures, and other data for the computing device 150.

Although the exemplary environment described herein employs a hard disk drive as a secondary storage device, other types of computer readable storage media are used in other embodiments. Examples of these other types of computer readable storage media include magnetic cassettes, flash memory cards, digital video disks, compact disc read only memories, digital versatile disk read only memories, random access memories, or read only memories. Some embodiments include non-transitory media. Additionally, such computer readable storage media can include local storage or cloud-based storage.

A number of program modules can be stored in secondary storage device 192 or memory 182, including an operating system 196, one or more application programs 198, other program modules 200 (such as the software engines described herein), and program data 202. The computing device 150 can utilize any suitable operating system, such as Microsoft Windows™, Google Chrome™, Google Android, Apple OS, Apple iOS, Linux, and any other operating system suitable for a computing device.

In some embodiments, a user provides inputs to the computing device 150 through one or more input devices, such as the touch sensitive display 216. Other input devices can also be used, such as a keyboard, mouse, pointer control device (such as a touch pad, touch stick, joy stick, etc.), microphone, and any other suitable input device. The input devices are often connected to the processing device 180 through an input/output interface 214 that is coupled to the system bus 184. Wireless communication between input devices and the interface 214 is possible as well, and includes infrared, BLUETOOTH® wireless technology, IEEE 802.11x Wi-Fi technology, cellular, or other radio frequency communication systems.

In this example embodiment, a display device 216, such as a monitor, liquid crystal display device, projector, or touch sensitive display device, is also connected to the system bus 184 via an interface, such as a video adapter 218. In addition to the display device 216, the computing device 150 can include various other peripheral devices (not shown), such as speakers or a printer.

When used in a local area networking environment or a wide area networking environment (such as the Internet), the computing device 150 is typically connected to the network 118 through a network interface 220, such as an Ethernet interface, or by a wireless communication device, such as using cellular or Wi-Fi communication.

The computing device 150 typically includes at least some form of computer readable media. Computer readable media includes any available media that can be accessed by the computing device 150. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 150. Computer readable storage media does not include computer readable communication media.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 4 is also an example of programmable electronics, which may include one or more such computing devices, and when multiple computing devices are included, such computing devices can be coupled together with a suitable data communication network so as to collectively perform the various functions, methods, or operations disclosed herein.

Figure 5:
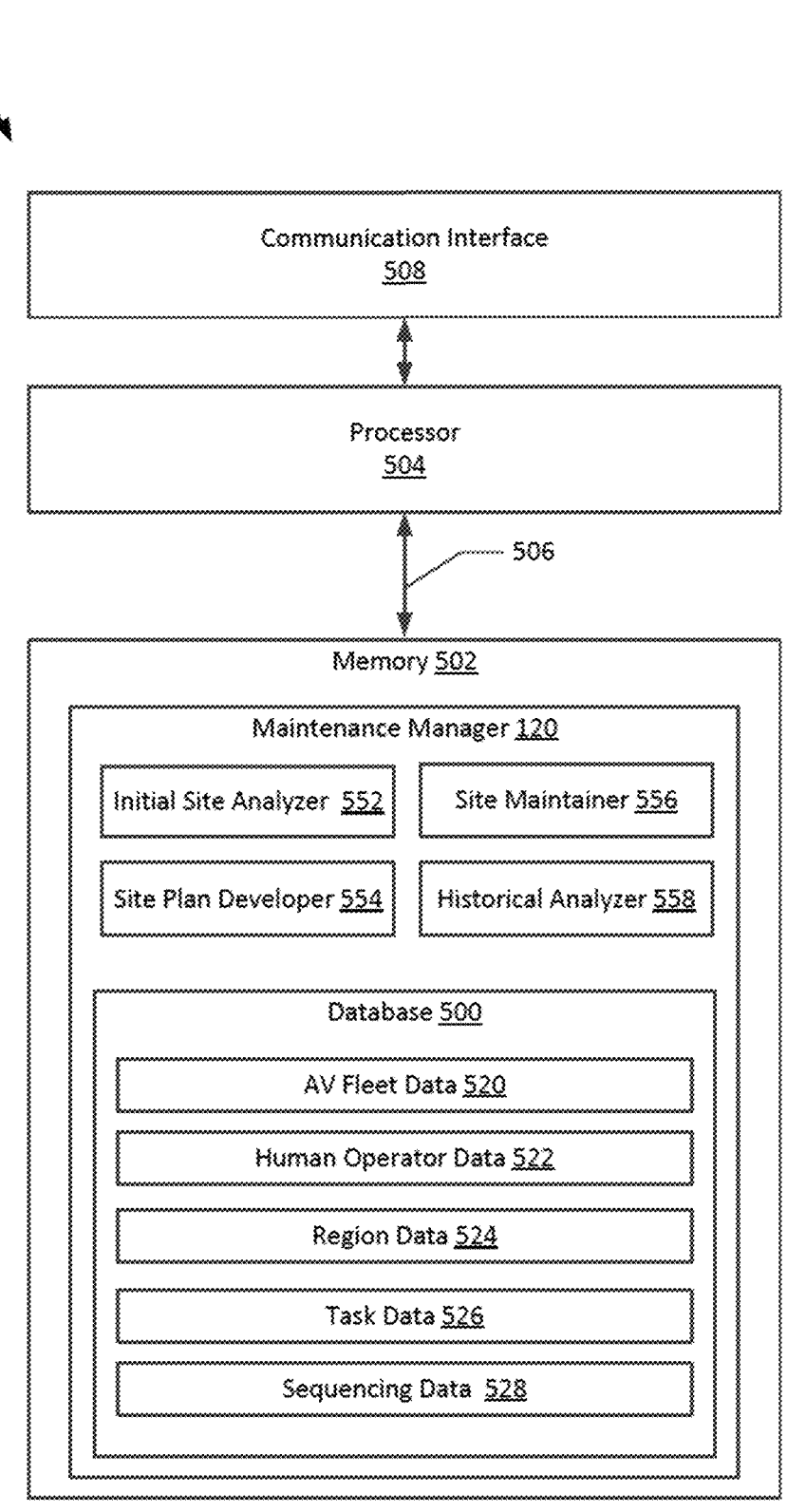
FIG. 5 is a schematic illustration of an example mainte-nance management computing system, in which aspects of the present disclosure can be implemented.

FIG. 5 is a schematic illustration of an example maintenance management computing system 102, in which aspects of the present disclosure can be implemented. The maintenance management computing system 102 can represent, for example, a native computing system. In some embodiments, the maintenance management computing system 102 is implemented as one or more virtualized or hosted systems, and executes one particular instruction set architecture while being used to execute non-native software and/or translate non-native code streams in an adaptive manner, for execution in accordance with the methods and systems described herein.

In the example shown, maintenance management computing system 102 hosts a database 500, which stores data related to maintenance of the site S. The maintenance management computing system 102 can, as noted above, generate outputs and perform analysis that integrates information from the site manager computing device 108, the autonomous vehicles 112, and the crew computing devices 114.

In the example shown, the database 500 is stored in a memory 502 alongside a maintenance manager tool 120. The memory 502 is an example of the memory 182 illustrated and described above with respect to FIG. 4. A processor 504 is communicatively connected via a bus 506 to the memory, and executes instructions stored in the memory, including instructions defining the maintenance manager tool 120. The processor 504 is an example of the processing device 152 illustrated and described above with respect to FIG. 4. A communication interface 508 allows the maintenance management computing system 102 to communicate with other devices, e.g., to receive data and provide output to other devices. The communication interface 508 is an example of the network interface 220 illustrated and described above with respect to FIG. 4.

In the embodiment shown, the database 500 stores autonomous vehicle data 520, human operator data 522, region data 524, task data 526, and sequencing data 528. The autonomous vehicle data 520 generally includes data sent to the database 500 from one or more autonomous vehicles 112. For example, fuel levels or battery power, GPS coordinates, task completion status, etc.

The human operator data 522 includes data sent to the database from one or more crew computing devices 114. For example, GPS coordinates, task completion status, etc.

The region data 524 includes data related to the regions of the site S. For example, the region data 524 can include the region type associated with each region and the boundaries or areas and locations of each of the regions.

The task data 526 includes data related to maintenances tasks required to be performed to maintain the site S. For example, the task data 526 can include task attributes such as the task name, the type of task (e.g. mowing, fertilizing, etc.), the task complexity, task prerequisites, or any other task attribute.

The sequencing data 528 includes data related to sequencing the maintenance tasks required to be performed to maintain the site S. For example, the sequence data 528 can define the order in which tasks are to be completed, and facilitate the scheduling of autonomous vehicles 112 and operators O1 and O2 to complete the tasks at particular times or ranges of times according to a sequence, etc.

Still referring to FIG. 5, the maintenance manager tool 120 includes an initial site analyzer 552, a site plan developer 554, a site maintainer 556, and a historical analyzer 558.

The initial site analyzer 552 determines whether the site S can benefit from incorporating one or more autonomous vehicles 112 into maintenance operations. For example the initial site analyzer 552 can output an estimated cost savings or time savings for the site S if one or more autonomous vehicles 112 are incorporated into maintenance operations, and can determine what type of autonomous vehicles 112 and how many autonomous vehicles 112 to recommend for the site S. The initial site analyzer 552 can base determination of cost and time savings, and autonomous vehicle recommendations, based on the size or area of the site S, the types of regions of the site S, and the maintenance complexity of each of the regions, e.g. the topography of the regions and types of maintenance tasks to be performed within the regions.

The site plan developer 554 determines a maintenance plan for the maintenance site S. In some embodiments, the site plan developer 554 defines the boundaries or areas of the regions of the site S included in the maintenance plan, classifies the region type of each of the regions, determines the required maintenance tasks, determines the complexity of each of the maintenance tasks and specific task rules, determines the sequence in which the required tasks need to be performed, and generates a the maintenance plan.

The site maintainer 556 assigns the tasks in the maintenance plan to the autonomous vehicles 112 and the maintenance crew C. In some embodiments, the site maintainer 556 can determine the task assignments, for example, based on region type and task complexity. For example, the site maintainer can determine that mowing a fairway on hole 1 of a golf course is to be assigned to an autonomous mower 112, and that mowing the edging of a stream running across the fairway on hole 9 is to be assigned to the operator O2 based on that region including a "high" complexity stream bank with a drop-off into the stream. The maintenance management computing system 102 can then communicate the assignments to the autonomous vehicles 112 and the crew computing devices 114. In some embodiments, the site maintainer 556 can monitor the performance of the assigned maintenance tasks. For example, the maintenance management computing system 102 can receive messages, GPS coordinates, or other data from the autonomous vehicles 112 and the crew computing devices 114 and the site maintainer can determine task progress based on the messages, the GPS location, and the other data. In some embodiments, the site maintainer 556 can handles exceptions to the maintenance plan that occur during execution of the maintenance plan. For example, the site maintainer can add or remove tasks and re-sequence the tasks in the plan to accommodate changes to the regions, the autonomous vehicles 112, and the human maintenance crew 114, and determine new task assignments based on the changes. For example, if an autonomous mower 112a hits a rock and breaks its blade and front wheel while mowing the rough on hole 1 of a golf course and cannot complete its task, a message can be sent to the site maintainer informing the site maintainer of the problem and the inability of the autonomous mower 112a to complete the task. The site maintainer can then assign a different autonomous mower to finish mowing the rough on hole 1, or assign a human operator O1 to repair the autonomous mower 112a, or both. Assigning the human operator can involve re-assigning the human operator O1 from a current task of e.g., clearing debris on hole 9, and that task can be deferred until later or re-assigned to another entity.

Further, if monitoring the performance of a task indicates that the task is taking longer than expected (e.g., the grass is too long and the mower has to go more slowly, or the mower broke down or was forced to stop for a period of time) then the site maintainer 556 can choose to assign additional resources (autonomous vehicles 112 or human operators O1 and O2) to assist in or take over that task.

The historical analyzer 558 can track the productivity of the maintenance system 100. In some embodiments, the historical analyzer 558 can determine recommendations for improving timeliness or reducing maintenance cost. For example, the historical analyzer can determine cost savings of adding additional autonomous vehicles 112 and recommend how many autonomous vehicles 112 to add and what type of autonomous vehicles 112 to add.

Figure 6:
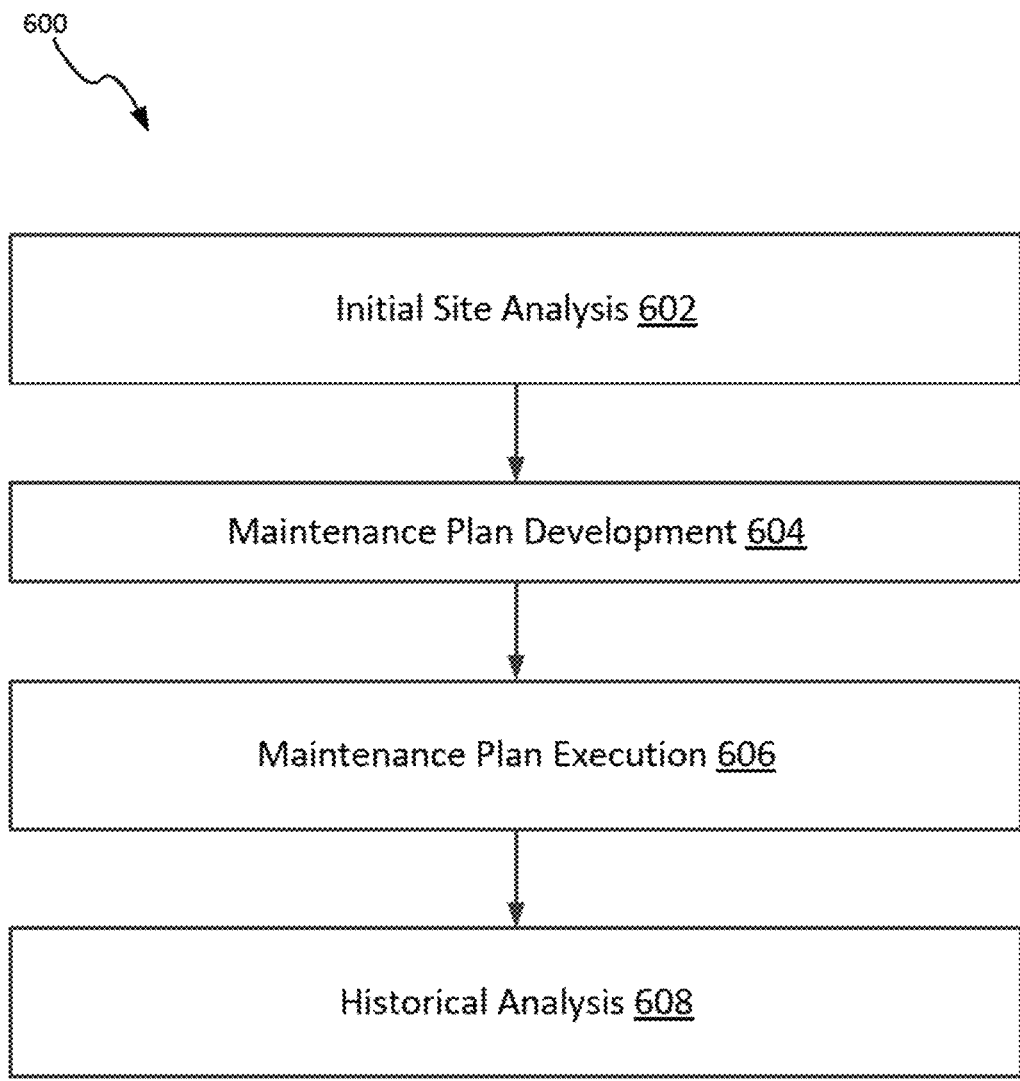
FIG. 6 is a flow chart illustrating a maintenance manage-ment method, in which aspects of the present disclosure can be implemented.

FIG. 6 is a flow chart illustrating an example method 600 of maintaining a site. In this example, the method 400 includes operations 602, 604, 606, and 608.

In the operation 602 initial site analysis is performed to analyze the site S, such as to determine whether the site S can benefit from incorporating one or more autonomous vehicles 112 into maintenance operations. For example, an estimated cost savings or time savings for the site S can be determined based on incorporation of one or more autonomous vehicles 112 into maintenance operations. In some embodiments, a recommendation of the type and number of autonomous vehicles to add to the maintenance of the site S can be determined at the operation 602. In some embodiments, the analysis of the site S includes the size or area of the site S, the types of regions of the site S, and the maintenance complexity of each of the regions, e.g. the topography of the regions. The operation 602 can be performed, for example, by the maintenance computing system 102 including the maintenance manager tool 120 executing the initial site analyzer 552 as illustrated and described above with respect to FIG. 5.

The operation 604 is performed to develop a maintenance plan for the maintenance site S. In some embodiments, the boundaries or areas of the regions of the site S are determined and the region type of each of the regions is classified at the operation 604. In some embodiments, the required maintenance tasks and the complexity of each of the maintenance tasks and specific task rules are determined at the operation 604. In still other embodiments, a sequence in which the required tasks are to be performed is generated at the operation 604. The operation 604 can be performed, for example, by a maintenance computing system 102 including the maintenance manager tool 120 executing the site plan developer 554 as illustrated and described above with respect to FIG. 5. In other examples, a user, such as the site manager SM described with reference to FIG. 1, can develop the maintenance plan and provide the maintenance plan as input to the maintenance computing system 102 for execution. In further examples, operation 604 can be performed by a combination of the user and the maintenance computing system 102. Examples of the operation 604 are illustrated and described in further detail with reference to FIGS. 7-11.

The operation 606 is performed to execute the maintenance plan. In some embodiments, operation 606 assigns the tasks in the maintenance plan to the autonomous vehicles 112 and the maintenance crew C. In some embodiments, the assignments can be communicated to the autonomous vehicles 112 and the crew computing devices 114 at the operation 606. In some embodiments, the performance of the assigned maintenance tasks can be monitored and exceptions to the maintenance plan that occur during execution of the plan or performance of the maintenance plan tasks can be handled at the operation 606. For example, new tasks can be added, tasks can be removed, and tasks can be re-sequenced at the operation 606. The operation 606 can be performed, for example, by a maintenance computing system 102 including the maintenance manager tool 120 executing the site maintainer 556 as illustrated and described above with respect to FIG. 5. Examples of the operation 606 are illustrated and described in further detail with reference to FIGS. 12-13.

The operation 608 performs historical analysis on the productivity of the maintenance system 100. In some embodiments, recommendations for improving timeliness or reducing maintenance costs can be determined at the operation 608. The operation 608 can be performed, for example, by a maintenance computing system 102 including the maintenance manager tool 120 executing the historical analyzer 558 as illustrated and described above with respect to FIG. 5.

Figure 7:
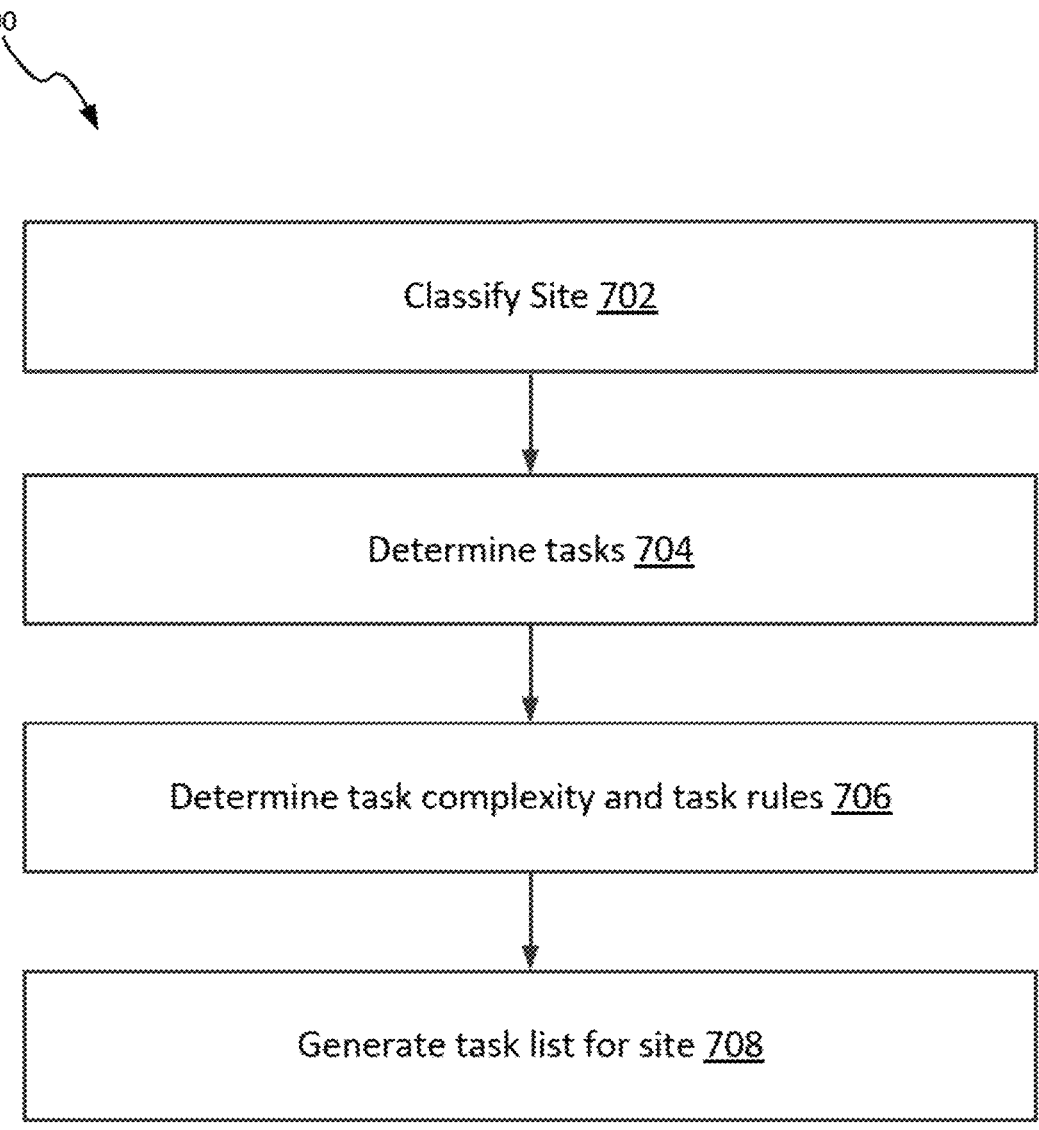
FIG. 7 is a flow chart illustrating a maintenance plan development method, in which aspects of the present dis-closure can be implemented.

FIG. 7 is a flow chart illustrating a method 700 of developing a maintenance plan. In this example, the method 700 includes operations 702, 704, 706, and 708. In some embodiments, the maintenance plan development method corresponds to the maintenance plan development operation 604 of the method 600.

The operation 702 classifies the site S. To classify the site S, captured images of the site S are received. In some examples, the images are captured using satellites. In other examples, a drone can be implemented to fly over the site S and capture images thereof. In some examples, the images captured by the drone are of a higher resolution than the images produced via satellite. In addition to capturing images, coordinates (e.g., a latitude and a longitude) associated with points in the image can be identified using GPS. Further, information associated with the site S can be captured utilizing human surveyors and/or autonomous vehicles 112 to survey the site S. In some examples, multiple classifications of the site S can be performed at different times in the year to account for differences in the site S from season to season based on weather and growth patterns.

The images are then processed to classify the site. In some examples, the classification can include multiple levels or layers of classification. For example, the classification can include a definition of boundaries of the site S. In some embodiments, the boundaries are determined and defined from the image of the site S. In some embodiments, the boundaries are defined by tracking a human or machine traversing the boundaries, for example, tracking the GPS coordinates of the crew computing device 114 or an autonomous vehicle 112 as the operator O1 or the autonomous vehicle 112 traverse the boundaries of the site S.

In some embodiments, classification can also include a determination of boundaries of each region of the site S. Region determination can include segmenting the site into a plurality of regions. Typically the regions are identified based on characteristics of portions of the site, where a region has at least one common characteristic. For example, regions can be defined based on maintenance characteristics, such as a desired length of grass (e.g., fairway versus rough). Other characteristics can also be used for segmenting portions of the site into the regions. For example, if the site is a golf course, regions can include tee boxes, fairways, roughs, bunkers, and greens, among other example regions.

The classification can further include a determination of region types of the regions included in the site S. As one example, the site manager SM can input region type designations for each of the regions to be stored in the region data 524 in the database 500 of the maintenance management computing device 102, e.g., by directing entering the region designations via a user interface of the maintenance management computing device, using the site manager computing device 108 in communication with the maintenance management computing device 102, or by using any computing device configured to communicate with the maintenance management computing device 102.

In addition to determining region types of the regions, the classification can determine a density of objects or features within the regions. In some examples, a map of the site is generated from the images that is annotated with the regions and/or features of the site. In some aspects, to improve accuracy of the classification, the regions can be further segmented into grids that are analyzed to determine features and the density thereof within each grid, as described with reference to FIGS. 8-9.

The classification can yet further include a computation of various scores for each of the regions based, at least in part, on the region type of the respective regions and associated features. The score can be associated with one or more of complexity and sensitivity of the region. For example, a determination is made as to whether a particular region of a site is feature rich or not (e.g., whether the density of the features within the region is high or not). A region that is feature rich indicates a higher complexity region, whereas a region that is not feature rich indicates a lower complexity region. Additionally, data related to a topography or terrain type of each region can provide more details, such as a slope of the region, from which an associated complexity and sensitivity score can be at least partly based upon. In some examples, the data related to a topography or terrain type is collected from a combination of the satellite or drone captured images and surveillance of the site by an autonomous vehicle. As the autonomous vehicle 112 surveys the site, it can collect data for slow tilt and other similar minor topographical or terrain changes that would not be detectable via satellite or drone image. In other aspects, a predefined threshold of complexity (e.g., 80% complexity) for one or more areas, or portions thereof, can trigger collection of additional information for the area beyond what the satellite and/or drone imagery provides. For example, a human surveyor will use their existing knowledge about the area or go out to physically survey the area, and/or an autonomous vehicle 112 is driven around the site with a human operator O1 to determine more information about the areas to facilitate determinations regarding complexity and sensitivity of the regions.

Using multiple layers of site data, including regions, region types, features, topography/terrain, and complexity and sensitivity parameters for site classification operation 702 captures site complexity across the site S. Site complexity can facilitate task assignment determinations (e.g., which tasks for the site S to assign to human operators O1 and O2 versus autonomous vehicles 112, and what types of autonomous vehicles to implement for each task), as described in greater detail below with reference to FIGS. 12 and 13.

The operation 704 determines the tasks required to complete site S maintenance. The required tasks can be determined based on the region types determined as part of the site classification performed at operation 702, and maintenance options chosen by the site manager SM. For example, the site manager can choose a mowing option for holes one through nine of a golf course, and the tasks required to complete mowing of holes one through nine can be determine based on the regions included in the hole one through nine at the operation 706. The site manager SM can choose a mowing option for all eighteen of the holes, and for the mowing to be repeated at regular or irregular intervals throughout the summer, and the tasks required to complete mowing of all eighteen holes can be determined based on the regions included in holes one through eighteen and the regular or irregular intervals at the operation 704. In some situations, the tasks to be performed at a region are the same for each region having the same region type. For example, a set of tasks for a region type associated with a golf green may include surveying the hole to ensure no golfers are present, removing the pin, mowing the grass in the region to a given length, and returning the pin. In some embodiments, exceptions can be applied to certain individual regions based on the unique characteristics of that region.

The operation 706 determines the task complexity and task rules associated with each of the required tasks determined at the operation 704. For example, task rules can include anticipated exceptions such as ceasing a mowing task at a particular region of a golf course to make way for golfers playing at or near that region. The task complexity, for example, can be a designation of how complex the task is, such as easy, moderate, or hard. In some embodiments, the task complexity can be a score on a particular scale, for example a five on a one to ten scale. In some embodiments the task complexity is on another scale, such as from 0 to 1, or from −1 to +1. In some embodiments, the task complexity can be determined based on the region type, autonomous vehicle capabilities, task rules, and other task or region attributes.

The operation 708 generates a task list for the site S. In some embodiments, the task list is generated based on the determined tasks at the operation 706. In some embodiments, a sequence of executing the tasks is determined at the operation 708, and the tasks are grouped based on sequence at the operation 708. The sequencing and grouping of the tasks is further described and illustrated below with respect to FIGS. 10-11.

Figure 8:
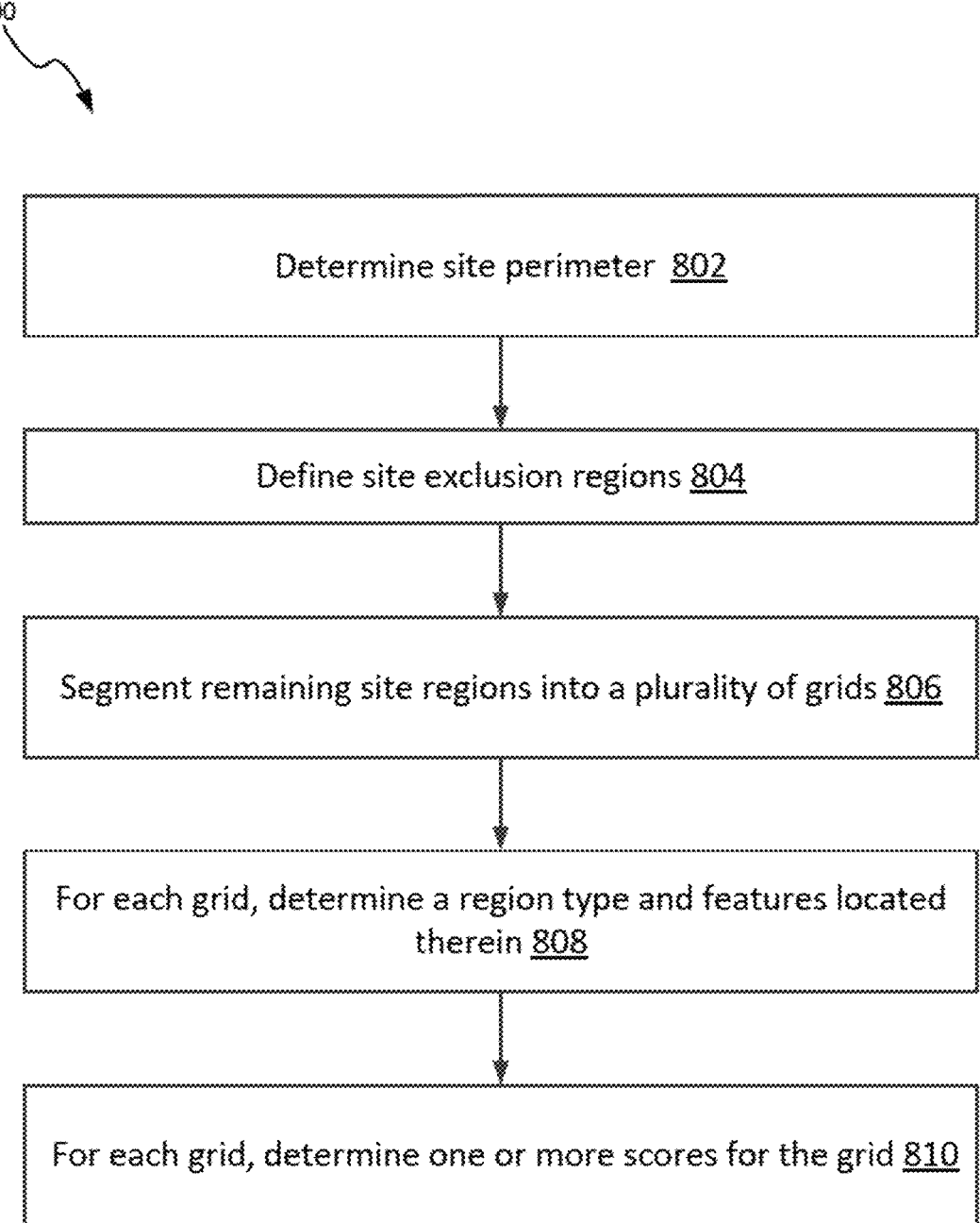
FIG. 8 is a flow chart illustrating a site classification method, in which aspects of the present disclosure can be implemented.

FIG. 8 is a flow chart illustrating a method 800 of classifying a site S. In this example, the method 800 includes operations 802, 804, 806, and 808. In some embodiments, the method 800 corresponds to the site classification operation 702 of the method 700.

As discussed above with reference to FIG. 7, satellite or drone captured images of the site can be processed to classify the site S. Operation 802 determines a perimeter of the site S. For example, using the image, a boundary is determined around the site S that forms the perimeter, and an area within the boundary is calculated to determine a total property area. Operation 804 defines exclusion regions within the site S. In some aspects, particular structures, such as buildings (e.g., a pro shop) are defined as exclusion regions because the structures and the area of the site S they occupy will not be a part of the site S for which the maintenance plan is developed.

Operation 806 segments remaining site regions (e.g., the total property area minus the exclusion regions) into a plurality of grids. The size of the grids can be dependent on the size and/or a type of site (e.g., a golf course versus a sports field versus a municipal park). As one example, each grid is a quarter acre. In some examples, the grids are square shaped. In other examples, non-square grids can be created, such as grids that are shaped as triangles, pentagons, or hexagons, among other examples. The grids can each be of equal size and same shape, or one or more of the grids can be of different sizes or shapes.

For each grid, a region type and features located therein are determined, including a number of each feature if applicable, at operation 808. The region type for a grid is based upon a region in which the grid is located. Features can include characteristics of an area to be maintained within the grid (e.g., grass, dirt, mulch, or concrete surfaces), as well as natural or man-made structures within the region, such as trees and flower beds. As one example, within a grid that is located in the rough of a hole of a golf course, there are seven trees, 20 square feet of hard surfaces (e.g., non-grassy surfaces), 600 feet of perimeter edging, trimming, lines, and other obstacles to maneuver around, such as flower beds. An example image of a site S in the form of a municipal park that includes grids with determined features, is shown in FIG. 9 below.

For each grid, one or more scores are determined at operation 810 based, at least in part, on the region type and features determined within the respective grid at operation 808. In some examples, the scores are parameters or factors used to classify each grid across the site. This classification yields a site complexity for each grid across the site S. The site complexity, among other factors, facilitates determinations of whether to assign a task to be performed within a grid to a human operator O1 versus an autonomous vehicle 112, described with reference to FIGS. 12 and 13 below.

In some examples, a complexity score for each grid is determined at operation 810 based, at least in part, on the region type and the features determined within the respective grid at operation 808. The complexity score is associated with a complexity of terrain within the grid. In some examples, the complexity score is a weighted score, where some features have a higher weight contributing to the score based on the increased complexity the feature adds to the area, such as a highly sloped drop off into a water hazard. The complexity score may indicate whether a task is able to proceed continuously or if various start and stops will be necessary to complete the task. To provide example scenarios, if a grid has only one tree or it is just open grass, the complexity score is low for that grid, and a task, such as mowing the grid, can proceed with limited starts and stops. If a number of features increases to five, including three trees, a cart path, and a bunker, the complexity score is medium, and the task can proceed with a few starts and stops to maneuver around the features. If a number of features increases to fourteen, including ten trees, a water hazard, two bunkers, and a cart path, the complexity score is low for that grid, and the task will likely require many starts and stops to maneuver around the features.

The complexity score can be at least one score that is used in determining whether tasks should be assigned to a human operator O1 and/or an autonomous vehicle 112. For example, tasks with higher complexity scores can be reserved for human operators O1 and O2, whereas tasks with lower to medium complexity scores can be assigned to an autonomous vehicle 112 with varying levels of human supervision. The features and complexity score determined can also aid in determining what type of autonomous vehicle 112 to assign to a task. For example, certain autonomous vehicle types are better suited for maneuvering around features, while others function better with little to no features.

In addition to the complexity score, a sensitivity score can be one of the scores determined for each grid at operation 810 based on the region type and features located within the grid. The sensitivity score is associated with a sensitivity of (e.g., a likelihood of causing damage to) the terrain, including the features, in each grid. For example, if the grid includes a flower bed and at least part of a green, this is a feature and region (or sub-region) type that can be more easily damaged, and thus the grid will have a higher sensitivity score. In some examples, the sensitivity score may also be associated with how dangerous the terrain in each grid is to an operator (e.g., based on the region type and features), where the sensitivity score is higher the more dangerous the terrain is. For example, if the grid includes a high slope that drops into a water hazard that presents an opportunity for human operators O1 and O2 and/or autonomous vehicles 112 to lose traction and fall into the water, the sensitivity score for the grid will be high. In contrast, if the grid includes an open area of grass with limited to no slope, the sensitivity score for the grid will be low. The sensitivity score can supplement the complexity score in determining whether tasks should be assigned to human operators O1 and O2 and/or autonomous vehicles 112.

As briefly discussed above, a combination of one or more of the complexity score and the sensitivity score for a grid can be used to determine whether to assign a task to be performed within the grid to a human operator O1 and/or an autonomous vehicle 112, including a type thereof. For example, if the task is to mow within a grid that includes a high slope area that drops into a water hazard, the complexity score for the grid is high. A high complexity score typically indicates that the task should be performed by a human operator O1. However, because the sensitivity score for the grid is also high due to the potential for the human and/or the autonomous vehicle 112 to slip and fall into the water while working on the high slope, an autonomous vehicle 112 that is specialized to perform tasks on steep slopes is recommended to perform the task instead.

In some aspects, the complexity score and the sensitivity score for a grid can be combined using a mathematical algorithm to yield a final score (e.g., a site complexity score for the grid), where the determination to assign the task to a human and/or an autonomous vehicle 112 is based, at least in part, on the final score. In some examples, the site complexity score for each of the grids can be visually indicated within the image. For example, a color or a pattern can be used to shade each grid according to a corresponding level of site complexity score. As one example, red can indicate a high score, yellow can indicate a medium score, and green can indicate a low score. Thus, similar to a heat map, a user, such as the site manager SM, can quickly visualize which grids, and thus which areas of the site S are the most complex, and need more careful attention when completing tasks within that area.

In other aspects, the site complexity score as a whole or the complexity score and the sensitivity score individually can be balanced with other factors, such as task complexity, time requirements, human operator availability, autonomous vehicle availability and requirements, in an optimization type process to determine whether to assign the task to a human operator O1 and/or an autonomous vehicle 112.

The operations 802 to 810 are included for illustration purposes. Classification of a site may be implemented by similar processes with fewer or additional operations, as well as in different order of operations using the principles described herein. For example, in some aspects, the site and plurality of regions therein may be segmented into a plurality of grids prior to defining exclusion regions.

FIG. 9 is an example image 900 of a site S that is classified using the site classification method described in FIG. 8. In the example shown, the site S is a municipal park comprised of regions indicated by dashed lines. The regions include a park building 902A through which you enter the park, a park area 902B, a playground area 902C, a soccer field 902D, and a baseball field 902E, collectively regions 902.

The image 900 is a satellite or drone captured image of the site S. A perimeter 904 of the site S determined by operation 802 is visually displayed within (e.g., overlaid on) the image 900. Additionally, any exclusion regions 906 defined by operation 804, such as the park building 902A which will not to be maintained within the site S, are visually displayed within the image 900. For example, the exclusion region 906 is visualized as being cut out of or removed from the perimeter 904 within the image 900. Further, grids 908 into which remaining site regions (e.g., inclusion regions 902B, 902C, 902D, 902E) are segmented by operation 808 are visually displayed within the image 900.

For each of the grids 908, a region type and features located therein are determined, including a number of each feature if applicable, at operation 808. To provide a clear example of this determination and the subsequent operations performed, a grid has been selected from each inclusion region of the site S: a first grid 908A, a second grid 908B, a third grid 908C, and a fourth grid 908D. However, similar steps are performed for each of the plurality of grids 908 located across the site S.

The first grid 908A is located within the park area 902B and thus has a region type associated with park area 902B. Within the first gird 908A, determined features include a portion of a lake, a picnic table positioned on grass, and a portion of a sidewalk that surrounds the lake. The second grid 908B is located within the playground area 902C and thus has a region type associated with the playground area 902C. Within the second gird 908B, determined features include an open grassy area that is located near but in a separate grid from playground equipment. The third grid 908C is located within the soccer field 902D and thus has a region type associated with the soccer field 902D. Within the third grid 908C, determined features include an open grassy area of the field corresponding to a center spot, a portion of a center circle and a portion of a half-way line of the field. The fourth grid 908D is located within the baseball field 902E and thus has a region type associated with the baseball field 902E. Within the fourth grid 908D, determined features include components of an infield: a dirt area that includes home plate and the three bases along a perimeter of the infield and a portion of grass within this dirt area on which a pitcher's mound comprised of dirt is located.

Based on the features determined within the respective grids 908, one or more of a complexity score and a sensitivity score, as described in detail with reference to FIG. 8, are determined for each grid 908. The complexity score and the sensitivity score for a grid can be then be used, among other factors, described with reference to FIG. 12, to determine whether to assign a task to be performed within the grid 908 to a human operator O1 and/or an autonomous vehicle 112, including a type of the autonomous vehicle 112.

For example, the complexity score for the first grid 908A is high due to the numerous features within the grid that would need to be maneuvered around or would result in stops or starts to perform a task. The sensitivity score is a medium to high score due to the obstacles created by the features and potential hazard created by the lake. Thus, based on the medium or high levels associated with each score, tasks to be performed within the first grid 908A will be assigned to the human operator O1.

For the second grid 908B, the complexity score is low as it is an open, grassy area. However, the sensitivity score is high because, although the area is open and grassy, the second grid 908B is located near a grid where playground equipment is located, and thus where children may be present. In some examples, the high sensitivity score will cause tasks to be performed within the second grid 908B to be assigned to a human operator O1 who is able to be more aware and vigilant of children in the area, although it otherwise could be a task efficiently performed by an autonomous vehicle 112.

For the third grid 908C, the complexity score is medium because although it consists of an open, grassy area, the portion of the center circle and half-way line contained within the third grid 908C need to be lined with positional accuracy. The sensitivity score is low as the area is comprised of only grass, and does not include potentially dangerous features. Therefore, the tasks to be performed within the third grid, such as mowing and lining, can be assigned to a specialized autonomous vehicle 112 that can operate in a low feature environment.

For the fourth grid 908D, the complexity score and sensitivity score is medium due to the combination of dirt and grassy surfaces. Therefore, tasks to be performed within the fourth grid, such as mowing the grassy area and raking and lining the dirt area, can be assigned to both a human operator and autonomous vehicle 112, where the human operator O1 performs more complex portions of the tasks.

FIG. 10 is an example maintenance plan 1000 in which aspects of the present disclosure can be implemented. In this example the maintenance plan 1000 includes maintenance plan attributes 1002 and tasks 1-1 through 5-1.

In the embodiment shown, the maintenance plan attributes 1002 includes an identifier of the site S, the regions included in the plan, and the region types of each of the regions included.

In the example shown, the maintenance plan 1000 includes nine tasks, e.g. task group 1 including tasks 1-1, 1-2, and 1-3, task group 2 including tasks 2-1 and 2-2, task group 3 including tasks 3-1 and 3-2, task group 4 including task 4-1, and task group 5 including task 5-1. Each of the tasks include the task attributes of a task name and a task type. For example, a task type attribute can be "mow" for a mowing task or "spray" for a spray treatment task. In the embodiment shown, each of the tasks also includes a task complexity. For example, the task complexity can be a designation of how complex the task is, such as easy, moderate, or hard. In some embodiments, the task complexity can be a score on a particular scale, for example a five on a one to ten scale (or 0.5 on a 0 to 1 scale). In some embodiments, the task complexity can be used by a maintenance management computing system 102 including the maintenance manager tool 120 to determine whether the task is to be assigned to an autonomous vehicle 112 or to a human operator O1.

In the example shown, each of the tasks also includes a task prerequisite. For example, some tasks require that other tasks included in the maintenance plan 1000 be completed before they can begin, or at least be partially completed, or be initiated. In the example shown in FIG. 10, the tasks are grouped by sequence. In the example shown in FIG. 10, the nine tasks in the maintenance plan 1000 are grouped according to their dependencies on each other, e.g. based on the completion of tasks that are prerequisites of other tasks. For example, the tasks of task group 1 do not depend on completion of each other for their initiation, but other tasks in the maintenance plan 1000 depend on completion of all of the tasks in task group 1. In the example shown, the tasks 2-1 and 2-2 have each of tasks 1-1, 1-2, and 1-3 as a task prerequisite, designated as "Task Group 1" in the task prerequisite attribute of each of tasks 2-1 and 2-2.

In some embodiments, the tasks can have multiple dependencies. For example, the tasks 3-1 and 3-2 depend on the tasks of task group 2, e.g. tasks 2-1 and 2-2, to be completed for their initiation, each of which depend on the completion of all of the tasks in task group 1. Further, task 4-1 does not depend on any other task being completed for its initiation, nor does any other task depend on task 4-1, e.g. task 4-1 is non-sequential and can be completed at any time or point in a sequencing of the tasks included in the maintenance plan

1000. Further details regarding sequencing of tasks based on task prerequisites are illustrated and described below in relation to FIG. 11.

In some embodiments, one or more of the tasks included in the maintenance plan include other attributes particular to that specific task, e.g. task attribute x. For example, a task can include an attribute regarding the expected amount of time it takes to complete the task, or the amount of fuel it takes a machine required to be used to complete the task, or the time of day at which the task is preferred to be executed.

Figure 11:
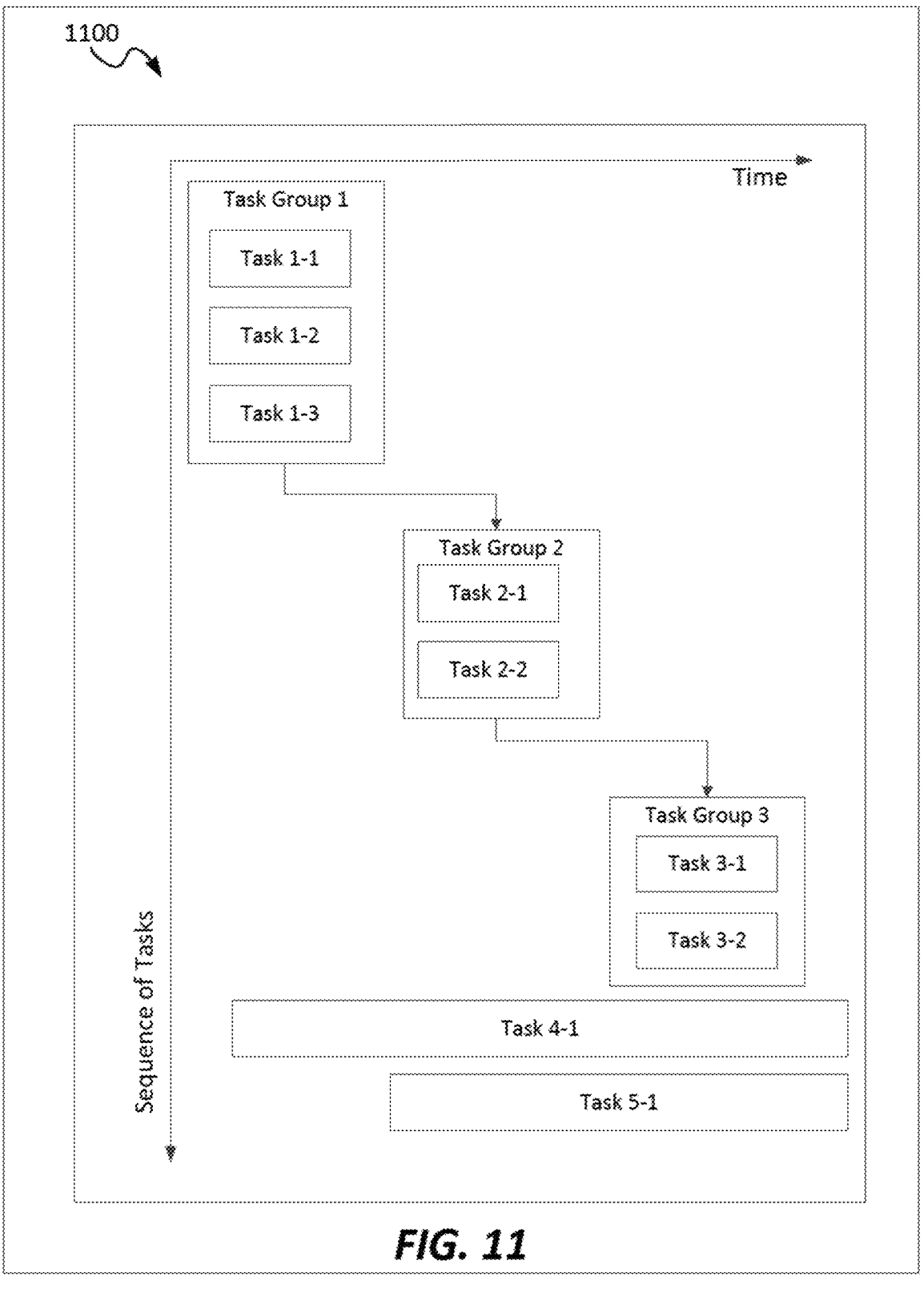
FIG. 11 is an example maintenance plan sequence in which aspects of the present disclosure can be implemented.

FIG. 11 is an example maintenance plan sequence 1100 in which aspects of the present disclosure can be implemented . . . . In the example shown in FIG. 11, the sequence 1100 is illustrated as a graph with the y-axis as progress along the sequence and the x-axis as time. In the example shown, the tasks of task group 1 are first in the upper left portion of the graph because they do not depend on any other tasks being completed, while other tasks do depend on the tasks of task group 1 being completed. The tasks of task group 1 are non-sequential with respect to each other because they do not depend on each other, as illustrated by each of those tasks being in the same range of time along the x-axis. In the example shown, task group 2 can be initiated upon the completion of all of the tasks of task group 1. The tasks of task group 2 are non-sequential with respect to each other, but sequential with respect to the tasks of task group 1 and task group 3, as illustrated as the tasks of task group 2 occurring after task group 1 in time along the x-axis and before the tasks of task group 3 in time. The tasks included in task group 3 can be initiated upon completion of all of the tasks of task group 2, and are thus illustrated as being after the tasks of task group 2 in time. In the example shown, the task 4-1 is "non-sequential" can be initiated at any time along the x-axis because it does not depend on any other task being completed, nor does any other task depend on task 4-1 being completed. In the example shown, the task 5-1 depends on task 1-2 being completed, e.g. the prerequisite for the task 5-1 is the task 1-2 as illustrated in FIG. 10. In the embodiment shown, the task 5-1 can be initiated at any time after the completion of the task 1-2.

In some embodiments, the sequencing and grouping of tasks can be based on one or more of the attributes of each of the tasks in the maintenance plan 1000 as well as the maintenance plan attributes 1002.

An example maintenance plan 1000 and sequence 1100 can be the mowing a hole on a golf course. The maintenance plan attributes 1002 can include the maintenance site, in this example, hole 1. The maintenance plan attributes can include a tee box region, a fairway region, and a green region, with region types "tee box", "fairway", and "green," respectively. The maintenance plan 1000 can include a task of removing the mens and ladies tee box distance markers from the tee box, a task of removing the pin from the hole, a task of surveying the regions to be mowed and removing any debris in the way, and a task of mowing each of the regions to a specified grass height based on region type. The tasks of removing the tee box distance markers, removing the pin, and surveying and clearing the regions do not have any prerequisites and can be initiated at any time. The mowing task has the surveying and clearing the regions of debris as a prerequisite for each of the regions and is sequenced to be initiated after completion of surveying and removal of debris. In the tee box region, the mowing has the removal of the distance markers task as a prerequisite and cannot initiate mowing the tee box until the markers have been removed. In the green region, the mowing has the removal of the pin task as a prerequisite and cannot initiate mowing the green until the pin has been removed. However, once the pin is removed, the mowing task in the green region does not have removal of the tee box distance markers as a prerequisite, and can initiate mowing the green if the distance markers have not been removed but the pin has and the green has been surveyed and debris removed. In this example, the complexity of the removal of the distance markers task, the pin removal task, and the surveying and debris removal task can be designated as "high," or by an appropriate score, because those tasks are not appropriate for an autonomous vehicle. The maintenance system 100 can then assign those tasks to human operators O1 and O2. In other embodiments, those tasks can be designated as "medium" or "low" complexity, or an appropriate complexity score, in the event that an autonomous vehicle with the capability to complete those tasks is available, e.g. a drone that can survey hole 1 and confirm that the regions of hole 1 are clear and ready to be mowed, and can assign those tasks to the appropriate autonomous vehicle 112.

Figure 12:
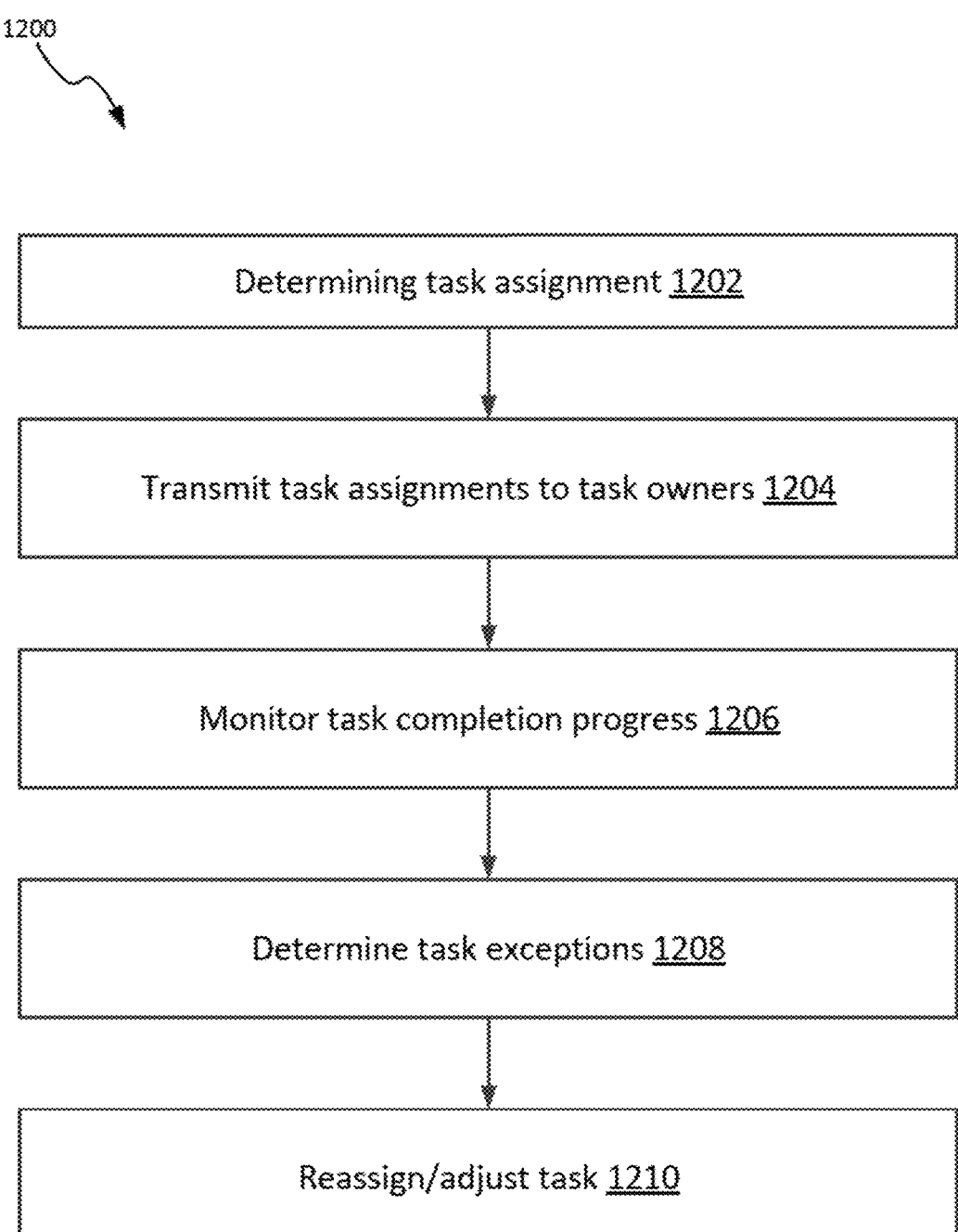
FIG. 12 is a flow chart illustrating a maintenance plan execution method, in which aspects of the present disclosure can be implemented.

FIG. 12 is a flow chart illustrating a maintenance plan execution method 1200, in which aspects of the present disclosure can be implemented. In this example, the method 1200 includes operations 1202, 1204, 1206, 1208, and 1210. In some embodiments, the maintenance plan execution method 1000 corresponds to the maintenance plan execution operation 606 of the method 600.

The operation 1202 determines assignments of each of the tasks in a task maintenance plan, e.g. the task maintenance plan 1000. In some embodiments, the task assignments are determined based on the site complexity, the task complexity and the capabilities and availability of one or more autonomous vehicles 112 and one or more members of the human maintenance crew C, as described in detail with reference to FIG. 13. In some aspects, a predefined ratio of tasks are assigned to autonomous vehicles 112 versus human operators O1 and O2. As one example, the ratio is 80/20 autonomous vehicle tasks to human operator tasks.

The operation 1204 transmits the task assignment to a task owner. In some embodiments, a task owner is a specific autonomous vehicle 112 or specific maintenance operator O1 of the human maintenance crew C. In some embodiments, the task assignments can be transmitted from the site maintenance management computing device 102 to the autonomous vehicles 112 and the crew computing devices 114.

The operation 1206 monitors task completion progress. For example, the maintenance management computing system 102 can receive messages, GPS coordinates, or other data from the autonomous vehicles 112 and the crew computing devices 114 and the site maintainer can determine task progress based on the messages, the GPS location, and the other data.

The data collected by the autonomous vehicles 112 can inform what regions, if any, the autonomous vehicle is having difficulty with. For example, data can indicate that the autonomous vehicle 112a is getting stuck one out of every five times it mows around a tree located in the rough near a border of the rough and fairway. This data can be used to optimize performance of that autonomous vehicle 112a by resetting a perimeter of the autonomous vehicle 112a to mow further back from the tree. In other examples, a different type of autonomous vehicle can be recommended to take over the task, such as an autonomous vehicle that utilizes vision-based localization.

The operation 1208 determines task exceptions. For example, a task exception can occur if there is an unexpected physical change to one or more regions of the site S, or if the site manager SM manually changes scheduling or sequencing of certain tasks of the maintenance plan. The operation 1208 can be performed, for example, by a maintenance computing system 102 including the maintenance manager tool 120 executing the site maintainer 556 as illustrated and described above with respect to FIG. 5.

The operation 1210 can reassign or otherwise adjust the determined assignments. In some embodiments, the operation 1210 can identify incomplete tasks from the maintenance plan and assign or reassign those tasks to one or more autonomous vehicles 112 or one or more maintenance operators of the human maintenance crew C.

Additionally, the monitoring performed at operation 1206 enables the maintenance management computing system 102 to analyze which tasks are in progress and those that have been completed to proactively assign a next task or reassign a current task in view of task timing data, described in greater detail in FIG. 13 below, and sequencing data 528 to increase timeliness. As one example, the monitoring data indicates human operators O1 and O2 are in a first area to complete a first task in a set of tasks, they complete the first task early, and their second task is in a second area where the autonomous vehicle 112 is currently performing a portion of the second task. Because the human operators O1 and O2 will be arriving to the second area ahead of schedule and can perform the remainder of the autonomous vehicle's task at least a quickly as the autonomous vehicle 112 could, the maintenance management computing system 102 can instruct the autonomous vehicle 112 to stop its performance of the second task and begin with its next task in a third area to increase time efficiency. As another example, several sites S share an autonomous vehicle 112 that is specialized to perform tasks on steep slopes. Once the autonomous vehicle 112 performs an assigned task on the steep slope, a human operator O1 can be assigned a task to transport the autonomous vehicle 112 to a next site to perform a task before the maintenance crew for the next site arrives to begin or supervise the task.

Figure 13:
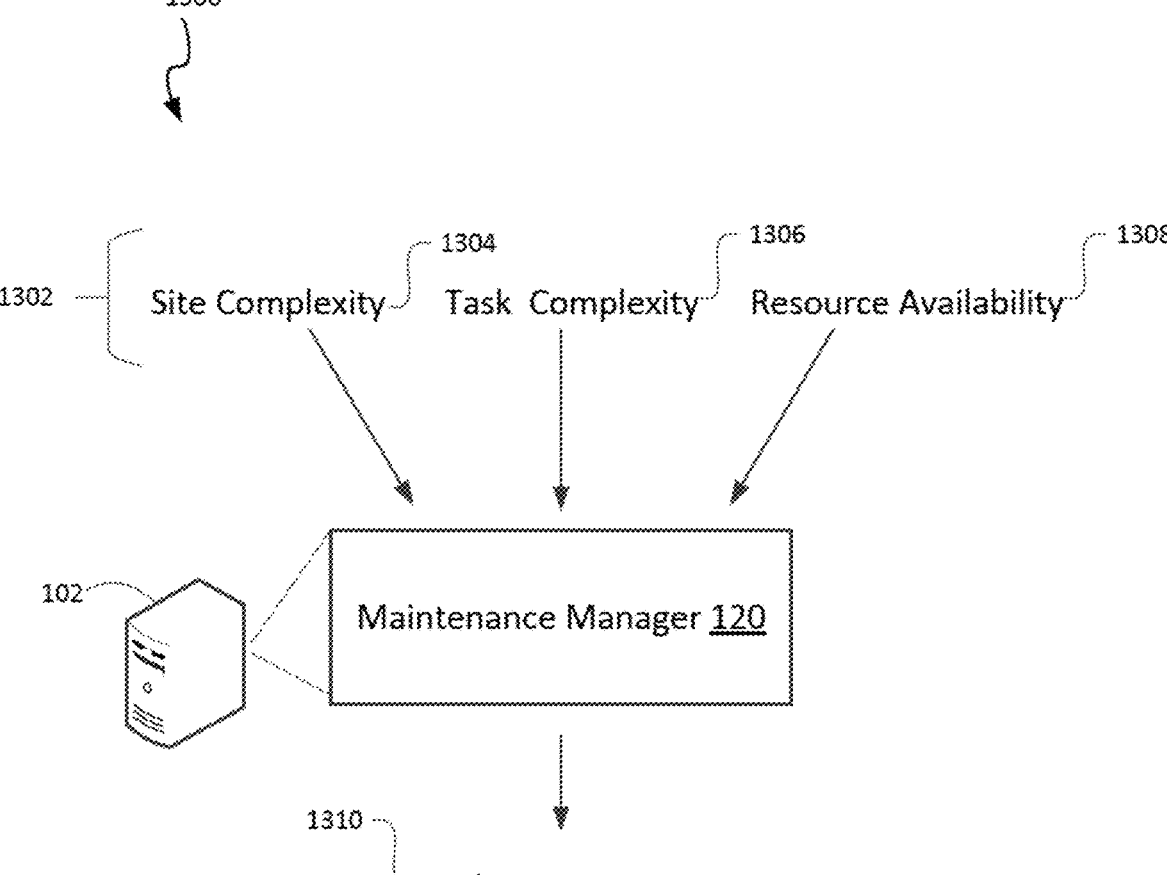
FIG. 13 is an example process for determining assignments of each maintenance task in a maintenance plan.

FIG. 13 is an example process 1300 for determining assignments of each maintenance task in a maintenance plan. In some embodiments, the process 1300 corresponds to or is performed as part of task assignment determination operation 1202 of the method 1200. The process 1300 can be performed, by a maintenance computing system 102 executing the maintenance manager tool 120.

The process includes provision of inputs 1302 to the maintenance manager tool 120. The inputs 1302 include site complexity 1304, task complexity 1306, and resource availability 1308. The site complexity 1304 can include a plurality of scores or parameters determined on a per-grid basis across regions of the site included within the maintenance plan, as described in detail with reference to FIG. 8. For each grid, the scores or parameters can include a complexity of an area within the grid and a sensitivity of the area within the grid for the grid based on a region type and features identified within the grid.

The task complexity 1306 can be based one or more parameters for each of the tasks in the maintenance plan that indicate a complexity associated with the task itself, such as a damage risk and availability of region in which task is performed, as described in greater detail with reference to FIG. 15 below.

The resource availability 1308 includes an availability of human operators O1 and O2 and autonomous vehicles 112. The availability includes a number of each available, as well as which particular human operators O1 and O2 and types of autonomous vehicles 112 that are available.

In some examples, the resource availability 1308 can also include data associated with task timing. For example, a time to perform a task can be estimated. In some examples, the time estimation can be based at least in part on one or more of the site complexity 1304 and the task complexity 1306. For example, if the task is to mow in a grid that is an open area with no features, and thus low complexity, a time to mow is estimated based on the square footage of the area to be mowed, as well as the speed and size of the mower. This estimate is likely to be consistent across iterations of the task. As the complexity score of the grid increases, the time to perform the task will also increase. Therefore, a directional estimate (e.g., that it will take more time) can be determined, and many iterations of the task can be performed to determine a quantitative time estimate. For example, the last four performances of the task took an average of x amount of time. The time taken to perform a task is one aspect utilized to schedule and plan tasks, and determine how many autonomous vehicles 112 and human operators O1 and O2 are needed to perform the task. The estimates can be also be adjusted for variable conditions, such as whether the grass may be longer or shorter due to the season or an unexpected weather pattern, among other similar examples. In some aspects, there are only a limited amount of human operators O1 and O2 and autonomous vehicle 112, as well as limited types of autonomous vehicles 112, and thus, the schedule needs to be prepared according to those known limits.

In some examples, for each of the tasks, a time it takes an autonomous vehicle 112 to do the task is compared to a time it takes a human operator O1 to perform the same task. The comparisons can be utilized to optimize the assignment of tasks such that the tasks are performed in a time-efficient manner. For example, if it takes a human operator O1 using a maintenance tool and an autonomous vehicle 112 about the same amount of time to mow an open area of grass, the task is assigned to the autonomous vehicle 112 over the human operator O1 to reserve the human operator O1 for a more complex task that the human operator O1 can perform more quickly than the autonomous vehicle 112 (e.g., edging around a flower box). Alternatively, if only a portion of the area in which the task is being performed is adding significant amounts of time to the overall time it takes for the autonomous vehicle 112 to perform a task (e.g., mowing around one tree located in the middle of open area), then a human can be assigned to cover that portion while the autonomous vehicle 112 performs remainder of the task.

In addition to a time it takes to perform the task, a time during which the task may be performed can also be taken into consideration. For example, if the site S is a golf course, autonomous vehicles 112 have a wider mowing window than human operators O1 and O2. Human operators O1 and O2 are limited from sun up to golf play start, while autonomous vehicle 112 might have an overnight window or a before sun up window and a at dusk window. However, the windows for the autonomous vehicle can also be dependent on whether human supervision is required for operation of the autonomous vehicle 112, and if so the windows are limited by times at which the supervision can be provided. Each autonomous vehicle 112 can be associated with varying levels of autonomy. In one example, there are five levels of autonomy ranging from level one to level five. Level one requires the most human supervision and interaction, whereas level five does not require any human supervision or interaction.

The maintenance manager tool 120 can then process the inputs 1302 to provide the task assignments as output 1310.

The tasks assignments can assign each of the tasks in the maintenance plan to a human operator O1 and/or an autonomous vehicle 112. In some examples, the individual inputs 1302 or various scores or parameters of each of the individual inputs 1302 can be weighted as part of the processing. For example, parameters associated with damage risk can be weighted more heavily than availability parameters.

Additionally, if tasks are assigned to autonomous vehicles, a type of autonomous vehicle 112 to be implement for each task is assigned. For example, various different types of autonomous vehicle 112 can be utilized to perform tasks. Some autonomous vehicles 112 are specialized to perform certain types of tasks (e.g., tasks on steep slopes). Additionally, some autonomous vehicles 112 are better suited for performing tasks in certain environments (e.g., feature rich environments versus open environments). One example type of autonomous vehicle 112 utilizes Robotic Technology Kernel (RTK). RTK is reliant on a line of sight to a satellite to operate. Therefore, this type of autonomous vehicle 112 is better suited for tasks in open areas, where no features, such as trees, block the line of sight from the autonomous vehicle 112 to the satellite. Another example type of autonomous vehicle 112 utilizes vision-based localization. This type of autonomous vehicle 112 is better suited for tasks in feature rich environments. The above described types of autonomous vehicles 112 are non-limiting and non-exhaustive examples, many other types of autonomous vehicles 112 can be selected from to perform a task.

Figure 14:
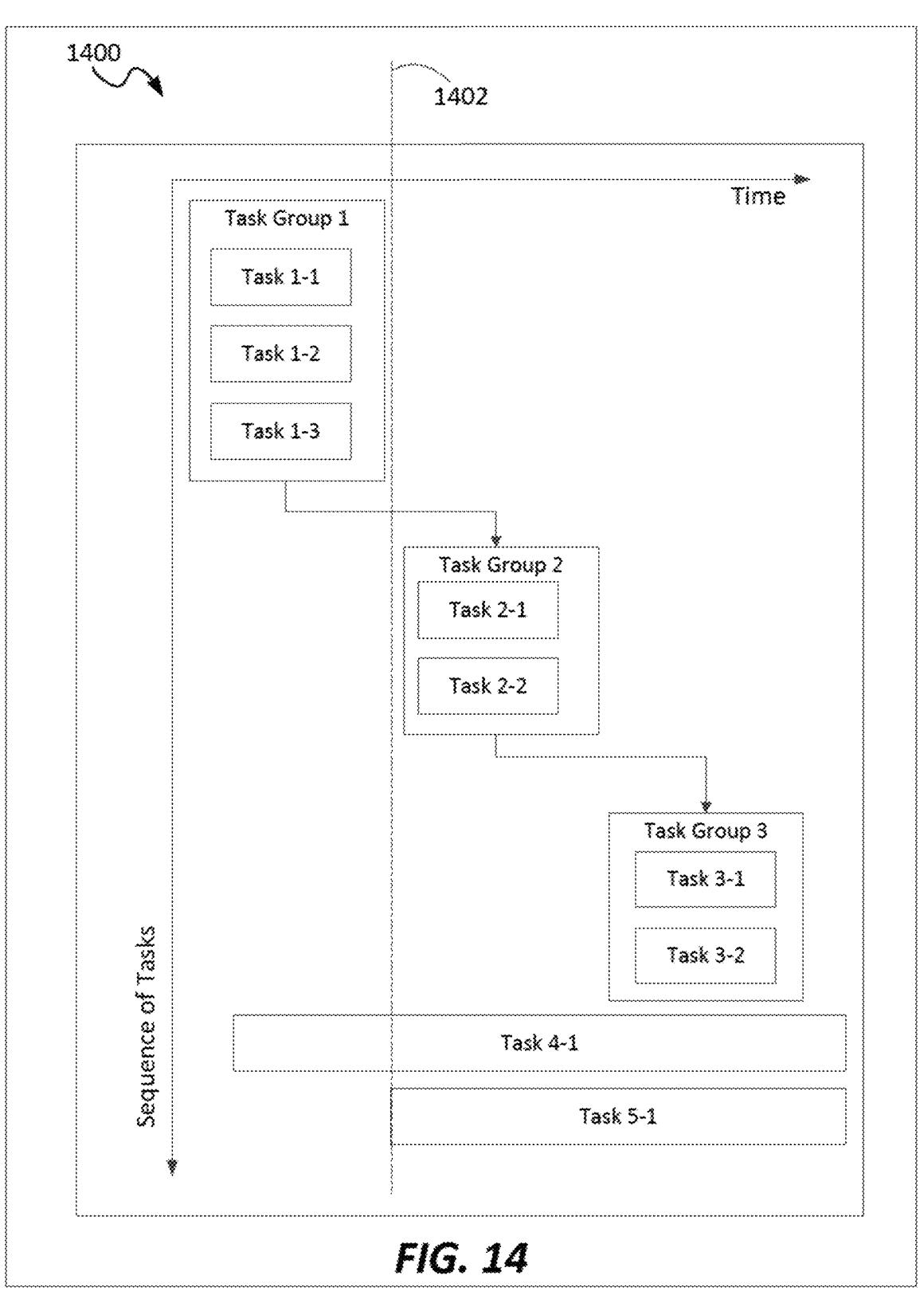
FIG. 14 is another example maintenance plan sequence in which aspects of the present disclosure can be implemented.

FIG. 14 is another example maintenance plan sequence 1400 in which aspects of the present disclosure can be implemented. The maintenance plan sequence 1400 generally corresponds to the maintenance plan sequence 1100 at a point in time at which the maintenance plan 1100 is partially completed. In the example shown, the point in time is illustrated as the task progress marker 1402, which separates the completed tasks to the left of the task progress marker 1402 earlier in time from the incomplete tasks to the right of the task progress marker 1402 that are to be completed at a future time. In some embodiments, the tasks immediately to the right of the task marker 1402 in the maintenance plan sequence 1400 represent the incomplete tasks that are to be completed next in the sequence. In some embodiments, the incomplete tasks that are to be completed next in the sequence can be assigned to one or more autonomous vehicles 112 and one or members of the human crew C. In other embodiments, the incomplete tasks that are to be completed next in the sequence can be unassigned. In some embodiments, the incomplete tasks that are to be completed next in the sequence that are unassigned can receive assignments from the site maintenance management computing system 102, for example, at the operation 1204 or the operation 1210 illustrated and described above with respect to FIG. 12.

Figure 15:
FIG. 15 is a chart illustrating a complexity of a maintenance task.

FIG. 15 is a chart 1500 illustrating a complexity of a maintenance task in which aspects of the present disclosure can be implemented. In some embodiments, a complexity of a maintenance task can be determined from one or more parameters. In the example shown, the complexity includes two parameters, P1 and P2, illustrated along the "axes" of the chart 1500. The complexity can be a multi-dimensional function with the parameters as the independent variables. In some embodiments, the complexity is determined from a single parameter, and in other embodiments the complexity can be determined from two, three, four, or any number of parameters. The chart 1500 can be considered a 2D simplification of the multi-dimensional function. In the example shown, each of the axes range from "low" to "high,"

indicating the level of the parameter illustrated on that axis for the particular maintenance task for which the complexity is determined. The chart 1500 also includes chart areas C1, C2, and C3, which correspond to complexity "areas" in the chart that indicate whether the determined complexity suggests, or requires, that operators, e.g. O1, O2, of the maintenance crew C or the autonomous vehicles fleet 111, e.g. autonomous vehicles 112*a-b*, perform that particular required maintenance task. In other words, the chart 1500 illustrates how the parameters can be used to determine whether the maintenance crew C 111 or autonomous vehicle fleet 112 are better suited to performing the maintenance task.

In the example shown, the chart 1500 includes a damage risk parameter P1. Damage risk P1 can include the risk of damage to an autonomous vehicle, for example, if a trim area abuts a gravel area there can be risk of blade damage from gravel impacting the blade of an autonomous mower. In the example shown, there is a threshold level T1 of the damage risk P1 above which an operator O1 is required for the maintenance task, indicated as the chart area C3. In some embodiments, the maintenance crew C is required for the task for damage risk P1 levels above the threshold level T1 irrespective of the levels of other parameters, e.g. the parameter P2, upon which the complexity of the task depends.

In the example shown, the chart 1500 includes a region availability parameter P2. Region availability parameter P2 can include the time availability of the region of the maintenance task. For example, if the region is available for only a short period of time, the maintenance task can be assigned to either the maintenance crew C or the fleet of autonomous vehicles 111 depending on the time it would take for each system to complete the task. In some embodiments, it may take a random path robotic mower longer than one or more operators O1, O2 on riding lawnmowers. In the example shown, when the region availability P2 is "low," the contribution the region availability to increasing the complexity is lower. In the example shown, the lower region availability corresponds to a short time-availability. For example, for a mowing task in a region at a site having either an operator O1 using a push mower or more guided robotic lawnmowers, it would take the guided robotic lawnmowers less time to complete the task. If the region has a damage risk P2 less than T1, the chart 1500 illustrates that the complexity is in the C1 region, and the robotic mowers, e.g. the autonomous vehicles 112, would be preferred or required, because the region availability is short and the autonomous vehicles would be faster than the operator O1 with a push mower, and there is a low enough risk of damage to the autonomous vehicles 112. If the region for the mowing task in this example has a damage risk above the threshold T1, the chart 1500 illustrates that the complexity is in the C4 region, and the human operator O1 with the push mower would be required even though the region availability is short and it would take the human operator O1 longer.

In the example shown, if the region availability P2 was higher, e.g. the time availability longer, the chart 1500 illustrates that the complexity is in the C2 region, the maintenance manager tool 120 can determine that either the maintenance crew C or autonomous vehicles 112 can be assigned to the maintenance task. In this example, the final determination of the complexity can depend on one or more other parameters.

In some embodiments, the complexity can depend on other parameters, such as a maintenance task quality level. For example, for a lawn mowing task, the complexity can depend on the after-cut appearance of the region. A lower desired after-cut appearance, e.g. the roughs on the holes of a golf course, may require less precision and can be assigned to autonomous lawn mowers 112. On the other hand, a higher desired after-cut appearance, e.g. a soccer field, may require the assistance of a human maintenance crew C to ensure the higher quality level.

In some embodiments, the complexity can include a historical task performance level. For example, if the task was easily completed in the past the autonomous vehicles 112, the maintenance task can be assigned to the autonomous vehicles 112 in the future. On the other hand, if the autonomous vehicles 112 struggled to complete the task in the past, the task can be assigned to the maintenance crew C.

In some embodiments, the complexity can include a task frequency. For example, a more frequent task can be categorized as a less complex task and suitable for the autonomous vehicles 112, whereas it can be more efficient for the human maintenance crew C to be assigned a less frequent task.

In some embodiments, the complexity can include a region continuity parameter. For example, if the region is non-continuous, e.g. if the region includes small plots of turf separated by a different surface, the region continuity parameter may be higher leading to a higher complexity for which it would be more appropriate or efficient to assign to the human maintenance crew C.

In some embodiments, the complexity can include an environmental damage risk parameter. For example, if the region for a lawn mowing task abuts a gravel area, there can be risk of a thrown object from a mower blade, impacting a building or bystanders. The environmental damage risk parameter may therefore be high, contributing to a higher complexity for which the task would be more appropriate for a human maintenance crew C.

In some embodiments, the complexity can include an operator risk parameter. For example, if the region is the center area of a roundabout for which the risk to a human operator O1 being hit by a vehicle is high, the operator risk parameter can contribute to a lower complexity, suggesting that the task would be more appropriate to be performed by the autonomous vehicles 112.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed is:

1. A method of maintaining an outdoor landscape site, the method comprising:

identifying a region of the outdoor landscape site to be maintained, the region being associated with a region type;

determining an outdoor landscape maintenance plan for the region, the outdoor landscape maintenance plan including outdoor landscape maintenance tasks to be completed based at least in part on the region type of the region;

assigning a first task from the outdoor landscape maintenance tasks to an autonomous vehicle;

based on the assignment, transmitting instructions to perform the first task to the autonomous vehicle;

executing the instructions on the autonomous vehicle to perform the first task by autonomously traversing the region while performing the first task on the region;

monitoring performance of the first task by receiving status updates indicating task progress from the autonomous vehicle as the autonomous vehicle autonomously traverses the region while performing the first task on the region;

after completion of the first task, identifying incomplete tasks from the outdoor landscape maintenance tasks of the outdoor landscape maintenance plan for the region;

determining a task complexity score for a second task from the incomplete tasks based on at least one of:

terrain variations within the region, and a risk of damage to the autonomous vehicle;

assigning the second task from the incomplete tasks to a second autonomous vehicle when the task complexity score of the second task exceeds a threshold; and based on the assignment of the second task, transmitting instructions to perform the second task to the second autonomous vehicle.

2. The method of claim 1, wherein the site is a turf site including turf grass, and wherein the maintenance tasks include at least mowing the turf grass.

3. The method of claim 1, wherein the autonomous vehicle and the second autonomous vehicle are part of a fleet of autonomous vehicles, and the fleet of autonomous vehicles comprises one or more of: lawn mowers, sprayers, mulchers, weeders, trimmers, chemical spreaders, sweepers, rakers, vacuums, snow blowers, blowers, aerators, top dressers, and cargo vehicles.

4. The method of claim 1, further comprising:

determining a sequence of at least some of the maintenance tasks; and selecting the first task from the maintenance tasks for assignment based at least in part on the sequence.

5. The method of claim 1, further comprising determining that the autonomous vehicle cannot complete the first task based on the status, and assigning the first task to the second autonomous vehicle.

6. The method of claim 1, wherein monitoring the performance of the first task further comprises:

determining an expected amount of time required to complete the first task; and determining that performance of the first task is behind schedule as compared with the expected amount of time.

7. The method of claim 6, further comprising:

after determining that performance of the first task is behind schedule, assigning the first task to one or more additional autonomous vehicles.

8. The method of claim 1, wherein the autonomous vehicles communicate with each other to coordinate task performance, and wherein assigning the second task to the second autonomous vehicle is based on communication between the autonomous vehicles.

9. A maintenance system for maintaining an outdoor landscape site, the system comprising:

a first autonomous vehicle;

a second autonomous vehicle; and a maintenance management computing system including a maintenance management tool including a computer readable storage device storing data instructions that, when executed by the maintenance management computing system, cause the maintenance management computing system to:

identify a region of the outdoor landscape site to be maintained, the region being associated with a region type;

determine an outdoor landscape maintenance plan for the region, the outdoor landscape maintenance plan including outdoor landscape maintenance tasks to be completed based at least in part on the region type of the region;

assign a first task from the outdoor landscape maintenance tasks to the first autonomous vehicle;

based on the assignment, transmit instructions to perform the first task to the first autonomous vehicle;

execute the instructions on the first autonomous vehicle to perform the first task by having the first autonomous vehicle autonomously traversing the region while performing the first task on the region;

monitor performance of the first task by receiving updates from the first autonomous vehicle as the first autonomous vehicle autonomously traverses the region while performing the first task on the region;

after completion of the first task, identify incomplete tasks from the outdoor landscape maintenance tasks of the outdoor landscape maintenance plan for the region;

determine a task complexity score for a second task from the incomplete tasks based on at least one of:

terrain variations within the region, and a risk of damage to the first autonomous vehicle;

assign the second task from the incomplete tasks to the second autonomous vehicle when the task complexity score of the second task exceeds a threshold; and based on the assignment of the second task, transmit instructions to perform the second task to the second autonomous vehicle.

10. The maintenance system of claim 9, further comprising maintenance tools including at least one computing device.

11. A method of developing a maintenance plan for an outdoor landscape site, the method comprising:

defining boundaries of the outdoor landscape site;

segmenting the outdoor landscape site into a plurality of regions;

associating each of the regions with a region type;

determining outdoor landscape tasks to be completed for each region type;

determining task complexity and task rules for the outdoor landscape tasks, wherein the task complexity includes a task complexity score based on at least one of:

terrain variations within the region, and a risk of damage to the autonomous vehicle;

generating the maintenance plan including a list of the outdoor landscape tasks for the outdoor landscape site, task complexity, and task rules;

assigning a first outdoor landscape task to an autonomous vehicle;

controlling the autonomous vehicle to perform the first outdoor landscape task by autonomously traversing a region while performing the first task on the region;

assigning a second outdoor landscape task to a second autonomous vehicle when the task complexity score of the second outdoor landscape task exceeds a threshold; and based on the assignment of the second outdoor landscape task, transmitting instructions to perform the second task to the second autonomous vehicle.

12. The method of claim 11, wherein the task complexity score represents a relative complexity of the outdoor landscape task when performed by the autonomous vehicle.

13. The method of claim 11, further comprising determining whether the outdoor landscape tasks are suitable for being performed by the autonomous vehicle, and storing the determination in the maintenance plan.

14. The method of claim 11, further comprising assigning attributes to at least some of the outdoor landscape tasks, wherein the attributes are selected from: an expected amount of time to complete the outdoor landscape task; an amount of fuel expected to be consumed in performance of the outdoor landscape task; and a time of day at which the outdoor landscape task is to be executed.

15. The method of claim 11, further comprising:
    segmenting the plurality of regions of the outdoor landscape site into a plurality of grids; and
    for each of the plurality of grids,
        determine a region type associated with the grid and features located within the grid, wherein one region type includes an exclusion region; and for each grid having a region type other than the exclusion region, determine one or more of the complexity score and a sensitivity score for the grid based on the region type and the features.

16. The method of claim 15, further comprising:
    for each grid having the region type other than the exclusion region, determining a site complexity associated with the grid based on the one or more of the complexity score and the sensitivity score.

17. The method of claim 15, wherein generating the maintenance plan further comprises:
    assigning each of the outdoor landscape tasks for the outdoor landscape site to one or more autonomous vehicles based on one or more of the site complexity associated with the one or more grids of the outdoor landscape site in which the outdoor landscape task is to be performed, the task complexity, and resource availability.

18. The method of claim 1, further comprising:
    assigning the first task to the second autonomous vehicle based on the status updates indicating task progress.

* * * * *